United States Patent
Cohen

(10) Patent No.: US 11,811,307 B2
(45) Date of Patent: Nov. 7, 2023

(54) METHODS AND APPARATUS TO IMPROVE POWER FACTOR CORRECTION CIRCUITS WITH VOLTAGE MULTIPLIER ASSIST

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 61 days.

(21) Appl. No.: 17/084,133

(22) Filed: Oct. 29, 2020

(65) Prior Publication Data
US 2021/0288574 A1    Sep. 16, 2021

Related U.S. Application Data

(60) Provisional application No. 62/988,684, filed on Mar. 12, 2020.

(51) Int. Cl.
H02M 1/42    (2007.01)

(52) U.S. Cl.
CPC ................ *H02M 1/4225* (2013.01)

(58) Field of Classification Search
CPC .................................................. H02M 1/4225
See application file for complete search history.

(56) References Cited

U.S. PATENT DOCUMENTS

| | | | | |
|---|---|---|---|---|
| 4,593,167 A * | 6/1986 | Nilssen | .................. | H05B 6/685 363/75 |
| 5,148,360 A * | 9/1992 | Nguyen | .............. | H02M 1/4266 323/208 |
| 2004/0027840 A1* | 2/2004 | Leisten | ................. | H02M 1/126 363/44 |
| 2016/0380531 A1* | 12/2016 | Kataoka | .............. | H02M 1/4225 323/210 |
| 2017/0104409 A1* | 4/2017 | Cohen | ..................... | H02M 1/10 |
| 2017/0302158 A1* | 10/2017 | Green | ..................... | H02M 1/44 |
| 2018/0337536 A1* | 11/2018 | Li | ............................. | H02J 7/00 |
| 2019/0326810 A1* | 10/2019 | Hashimoto | ......... | H02M 1/4233 |
| 2019/0326829 A1* | 10/2019 | Hashimoto | ........... | H02M 7/062 |

OTHER PUBLICATIONS

Jindong Zhang, "Advanced Single-Stage PFC Techniques with Voltage-Doubler Rectifier Front End For Universal-Line Applications," Advanced Integrated Single-Stage Power Factor Correction Techniques, Mar. 15, 2001, pp. 199-243 (45 pages).

(Continued)

*Primary Examiner* — Peter M Novak
(74) *Attorney, Agent, or Firm* — Charles F. Koch; Frank D. Cimino

(57) ABSTRACT

An example controller includes: an absolute value circuit having a voltage output and first and second power inputs, the first and second power inputs adapted to be coupled to an alternating current (AC) power source, and a comparator having a comparator output and first and second comparator inputs, the first comparator input coupled to the voltage output, the second comparator input adapted to be coupled to an output terminal of a power factor correction (PFC) circuit, and the comparator output adapted to be coupled to a control input of the PFC circuit.

24 Claims, 16 Drawing Sheets

(56) References Cited

OTHER PUBLICATIONS

ON Semiconductor, "Power Factor Correction (PFC) Handbook: Choosing the Right Power Factor Controller Solution," Revised Apr. 2014 (130 pages).

A. Fernandez, J. Sebastian, M. M. Hernando, P. Villegas and J. Garcia, "Helpful hints to select a power-factor-correction solution for low— and medium-power single-phase power supplies," in IEEE Transactions on Industrial Electronics, vol. 52, No. 1, pp. 46-55, Feb. 2005, doi: 10.1109/TIE.2004.841141 (10 pages).

\* cited by examiner

METHODS AND APPARATUS TO IMPROVE POWER FACTOR CORRECTION CIRCUITS WITH VOLTAGE MULTIPLIER ASSIST

CROSS-REFERENCE TO RELATED APPLICATION

This patent application claims the benefit of and priority to U.S. Provisional Patent Application No. 62/988,684 filed Mar. 12, 2020, which is hereby incorporated herein by reference in its entirety.

TECHNICAL FIELD

This relates generally to power factor correction circuits, and more particularly to methods and apparatus to improve power factor correction circuits with voltage multiplier assist.

BACKGROUND

Switching mode power supplies are prevalent in automotive, computing, network, server, telecom, and other industrial applications. Accordingly, high-power efficiency is an important consideration in the design of a switching mode power supply, especially for energy saving and environmental protection. In some instances, switching mode power supplies include a power factor correction circuit, which can improve the power factor of a power system but can increase power losses and reduce the overall efficiency of the switching mode power supplies.

SUMMARY

An example controller includes: an absolute value circuit having a voltage output and first and second power inputs, the first and second power inputs adapted to be coupled to an alternating current (AC) power source, and a comparator having a comparator output and first and second comparator inputs, the first comparator input coupled to the voltage output, the second comparator input adapted to be coupled to an output terminal of a power factor correction (PFC) circuit, and the comparator output adapted to be coupled to a control input of the PFC circuit.

DETAILED DESCRIPTION

Figure 1:
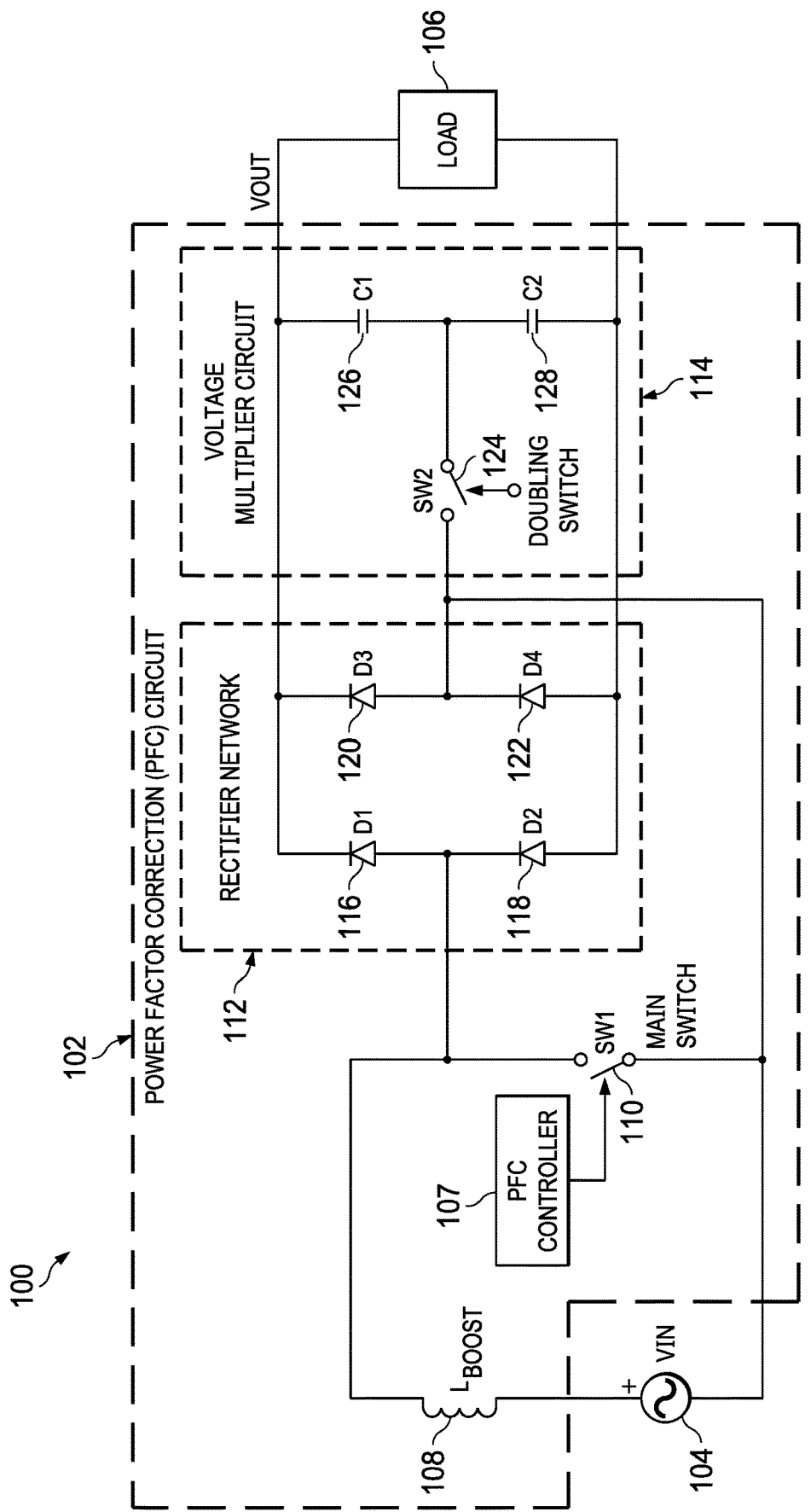
FIG. 1 is a schematic diagram of a first example power factor correction (PFC) circuit including an example voltage multiplier circuit.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

High-power efficiency is an important consideration in the design of a switching mode power supply, especially for energy saving and environmental protection. For example, public and private sector regulatory initiatives have pushed for improvements in overall efficiencies of power supply systems to improve power quality. Power Factor (PF) is a measure of power quality and is the ratio between actual power used (e.g., Active Power) and delivered power (e.g., Apparent Power). Less than unity PF may be caused by nonlinear loads, such as motor drives, switching power supplies, solid-state lighting fixtures, etc. Poor PF may manifest itself as substantially large current spikes requiring thicker conductors, cables, etc., to deliver power to a load.

Power Factor Correction (PFC) seeks to achieve a PF near unity for a power delivery system by suppressing the harmonic distortions in the AC line current caused by nonlinear loads. Active PFC methods may include a control circuit that measures an input voltage and current and then adjusts a switching time and duty cycle of a transistor (e.g., a power transistor) in the control circuit to ensure that the instantaneous input current is always proportional to the instantaneous input voltage. For example, the control circuit can determine that the instantaneous input current is not proportional to the input voltage. In such examples, the control circuit adjusts the switching frequency and duty cycle of the transistor to force the necessary proportionality, thereby assuring near unity PF.

Wide input PFC circuits (sometimes referred to as universal input PFC circuits or converters) exhibit significantly lower efficiency at a low end of an input voltage range (such as 100V alternating current (AC)), 110V AC, etc.). At the low end of the input voltage range, root mean square (RMS) currents increase significantly, which can cause higher copper loss in all magnetic devices and other elements of the PFC circuits. Examples described herein add voltage multiplier (such as voltage doubling, voltage tripling, etc.) capability to PFC circuits, such as a bridgeless PFC circuit. In some described examples, a PFC circuit includes a voltage multiplier circuit, which includes at least two capacitors in series and a bidirectional switch coupled between the at least two capacitors. Advantageously, such an example voltage multiplier circuit can reduce duty cycle and operating frequency of the PFC circuit, thereby reducing losses and increase the efficiency of the PFC circuit.

FIG. 1 is a schematic diagram of a first example power conversion system 100 including a first example PFC circuit 102. The first power conversion system 100 includes the first PFC circuit 102 to reduce current spikes and deliver a consistent, steady output voltage. In this example, the first PFC circuit 102 is a bridgeless PFC boost converter. Alternatively, any other PFC circuit may be used such as a totem pole PFC (such as a totem pole bridgeless PFC, a totem pole bridgeless PFC boost converter, etc.). The first power conversion system 100 includes an example power source 104 having a voltage VIN, and an example load 106. The power source 104 is an AC power source (such as a 110V AC power source, a 220V AC power source, etc.). The load 106 is an electrical device. For example, the load 106 can be a computing device (such as an Internet-enabled smartphone, tablet computer, desktop computer, etc.) or portion(s) thereof (such as a central processing unit (CPU), a graphics processing unit (GPU), etc.). In other examples, the load 106 can be an Internet-of-Things (IoT) device, such as wall-powered sensor (such as a humidity sensor, a light sensor, a temperature sensor, etc.). In yet other examples, the load 106 can be any other electrical device powered by a direct current (DC) power source.

The first PFC circuit 102 includes an example PFC controller 107, an example inductor ($L_{BOOST}$) 108, a first example switch (SW1) 110, an example rectifier (such as a rectifier circuit, a rectifier network, etc.) 112, and an example voltage multiplier circuit (such as a voltage doubler circuit, a voltage tripler circuit, etc.) 114. In this example, the first switch 110 is a transistor (such as a field-effect transistor (FET), a metal-oxide-semiconductor field-effect transistor (MOSFET), etc.). In this example, the first switch 110 is a PFC switch to control PFC operation of the first PFC circuit 102. The first switch 110 has a first terminal (such as a first current terminal, a first drain or source terminal, etc.), a second terminal (such as a second current terminal, a second drain or source terminal, etc.), and a control terminal (such as a gate terminal, a gate input, etc.). For example, the first switch 110, when implemented as a MOSFET (such as an N-channel MOSFET, a P-channel MOSFET, etc.), can have a first current terminal (e.g., a drain terminal), a second current terminal (e.g., a source terminal), and a gate terminal. Alternatively, the first switch 110 may be implemented with any other type of switch.

An output terminal (e.g., a controller output terminal) of the PFC controller 107 is coupled to the control terminal of the first switch 110. For example, the PFC controller 107 can generate a first control signal (e.g., a first control output) to close and/or otherwise enable the first switch 110. In other examples, the PFC controller 107 can generate a second control signal (e.g., a second control output) to open and/or otherwise disable the first switch 110. In this example, the PFC controller 107 can be implemented using hardware logic, machine readable instructions, hardware implemented state machines, and/or any combination thereof. For example, the PFC controller 107 can be implemented with hardware, software, firmware, and/or any combination thereof.

The first power conversion system 100 includes the rectifier network 112 to convert an AC voltage (VIN) from the power source 104 to a DC voltage (VOUT) using a diode-bridge configuration. For example, the first power conversion system 100 can convert a voltage input of 110V AC, 220V AC, etc., to a voltage output of 400V DC. In this example, the rectifier network 112 includes a first example diode (D1) 116, a second example diode (D2) 118, a third example diode (D3) 120, and a fourth example diode (D4) 122. The first diode 116 has a first anode and a first cathode. The second diode 118 has a second anode and a second cathode. The third diode 120 has a third anode and a third cathode. The fourth diode 122 has a fourth anode and a fourth cathode. Alternatively, one or more of the first diode 116, the second diode 118, the third diode 120, and/or the fourth diode 122 may be implemented with a transistor (such as a FET, a MOSFET, etc.).

The first power conversion system 100 includes the voltage multiplier circuit 114 to change charging operations of a first example capacitor (C1) 126 and a second example capacitor (C2) 128 responsive to enabling the voltage multiplier circuit 114. For example, responsive to enabling the voltage multiplier circuit 114, the voltage multiplier circuit 114 can cause the first capacitor 126 to be charged during a positive half-line cycle and cause the second capacitor 128 to be charged during a negative half-line cycle.

In this example, the voltage multiplier circuit 114 includes a second example switch (SW2) 124, the first capacitor 126, and the second capacitor 128. In this example, the second switch 124 is a bi-directional switch. For example, the second switch 124 can be implemented with two or more switches (such as FETs, MOSFETs, etc.) coupled together in an arrangement to implement a bi-directional switch. In such examples, the second switch 124, when implemented as two or more MOSFETs (such as an N-channel MOSFET, a P-channel MOSFET, etc.), can have a first current terminal (e.g., a drain terminal, a source terminal), a second current terminal (such as a drain terminal, a source terminal, etc.), and a gate terminal. Advantageously, the second switch 124 implemented as a bi-directional switch facilitates current to flow in either direction. In this example, the first capacitor 126 has a first terminal (e.g., a first capacitor terminal) and a second terminal (e.g., a second capacitor terminal). In this example, the second capacitor 128 has a third terminal (e.g., a third capacitor terminal) and a fourth terminal (e.g., a fourth capacitor terminal).

The power source 104 has a first terminal (such as a first power source terminal, a first voltage terminal, etc.) coupled to a first terminal (e.g., a first inductor terminal) of the inductor 108. A second terminal (e.g., a second inductor terminal) of the inductor 108 is coupled to: a first terminal of the first switch 110, the first anode, and the second cathode. In this example, a terminal between the first anode and the second cathode is a rectifier input of the rectifier network 112. In this example, the first PFC circuit 102 includes the inductor 108. Alternatively, the first PFC circuit 102 may not include the inductor 108. For example, the first terminal of the first switch 110, the first anode, and/or the second cathode may be adapted to be coupled to the second terminal of the inductor 108.

The first cathode is coupled to: the third cathode, the first capacitor terminal, and a first load terminal of the load 106. In this example, a terminal between the first cathode, the third cathode, etc., and the first capacitor terminal is a rectifier output of the rectifier network 112. The second anode is coupled to: the fourth anode, the fourth capacitor terminal, and a second load terminal of the load 106. The third anode is coupled to: the fourth cathode, a first terminal of the second switch 124, a second terminal of the first switch 110, and a second terminal (such as a second power source terminal, a second voltage terminal, etc.) of the power source 104. In this example, a terminal between the third anode and the fourth cathode is a rectifier input of the rectifier network 112. The second capacitor terminal is coupled to: the second terminal of the second switch 124 and the third capacitor terminal.

In this example, the power conversion system 100 includes the power source 104 and the load 106. Alternatively, the power conversion system 100 may not include the power source 104 and/or the load 106. For example, the second terminal of the first switch 110, the third anode, the fourth cathode, and/or the second terminal of the second switch 124 may be adapted to be coupled to the second terminal of the power source 104. In such examples, the first cathode, the third cathode, and/or the first capacitor terminal may be adapted to be coupled to the first load terminal. In some such examples, the second anode, the fourth anode, and/or the fourth capacitor terminal may be adapted to be coupled to the second load terminal.

In example operation, current from the first capacitor 126 and the second capacitor 128 is delivered to the load 106. The load 106 sees a sum of voltages of the first capacitor 126 and the second capacitor 128. In example operation, responsive to the first switch 110 being turned on, current from the power source 104 builds in the inductor 108.

When the instantaneous voltage input is greater than half of the voltage output (such as VIN=220V AC, 240V AC, etc.), the voltage multiplier circuit 114 is disabled. For example, the voltage multiplier circuit 114 is disabled because a voltage difference between a desired voltage output (e.g., 400V DC) and the rectified voltage is relatively small. In this example, responsive to turning off the first switch 110, current flows from the inductor 108 to charge the first capacitor 126 and the second capacitor 128 while current from the first capacitor 126 and the second capacitor 128 is delivered to the load 106.

When the instantaneous voltage input is less than half of the voltage output (such as VIN=85V AC, 120V AC, etc.), the voltage multiplier circuit 114 is enabled. For example, the voltage multiplier circuit 114 is enabled because a voltage difference between a desired voltage output (e.g., 400V DC) and the rectified voltage is relatively large. During a positive switching cycle when the first switch 110 is turned off and the second switch 124 is turned on, current flows from the inductor 108 to charge the first capacitor 126. During a negative switching cycle when the first switch 110 is turned off and the second switch 124 is turned on, current flows from the inductor 108 to charge the second capacitor 128.

Figure 2:
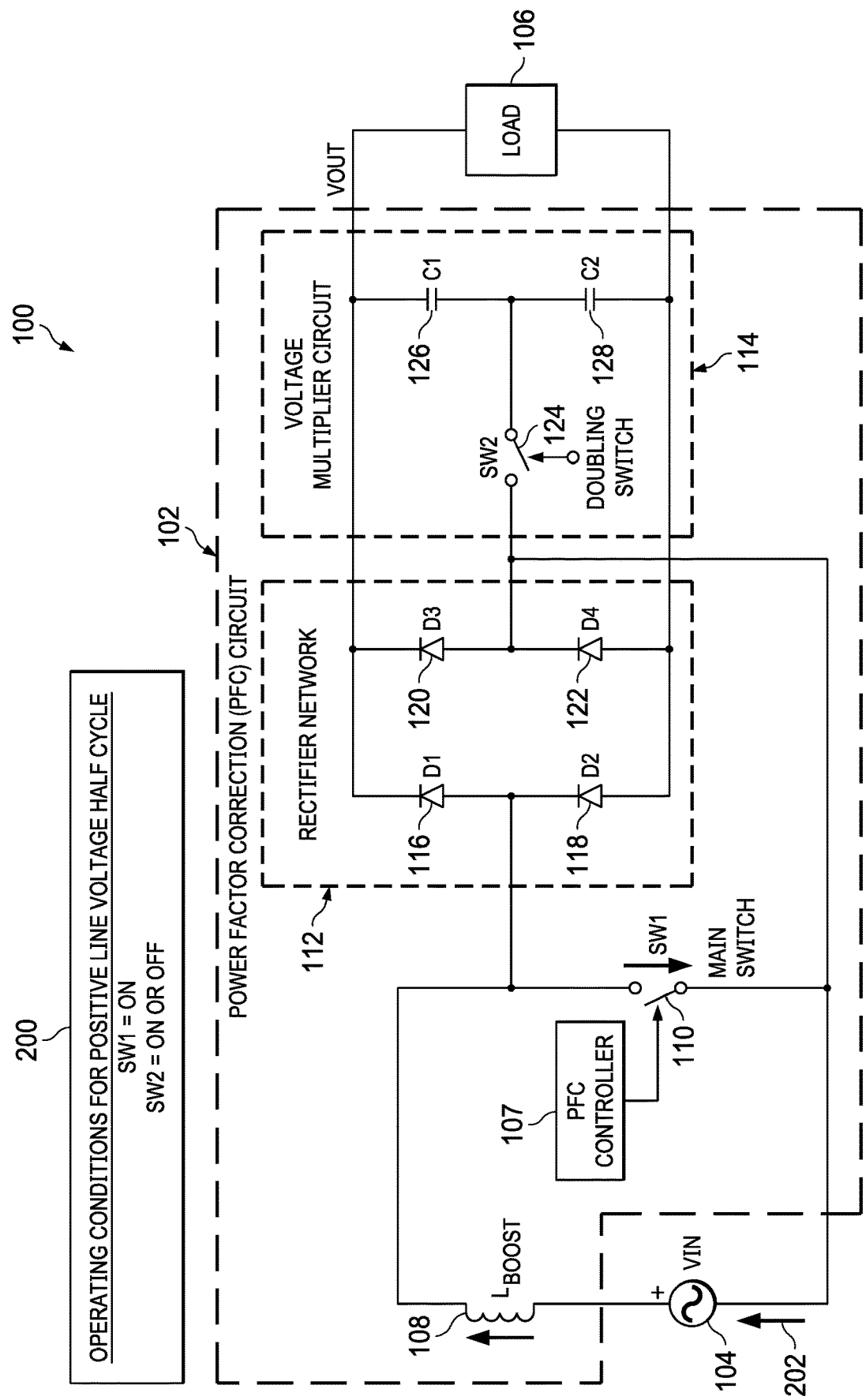
FIG. 2 is a schematic diagram of the first PFC circuit of FIG. 1 in first example operating conditions.

FIG. 2 is a schematic diagram of the first power conversion system 100 of FIG. 1 including the first PFC circuit 102 of FIG. 1 in first example operating conditions 200. The first operating conditions 200 are for a half cycle (e.g., a half switching cycle) of the first PFC circuit 102 in which the line voltage (e.g., a voltage generated by the power source 104) is positive. The first operating conditions 200 include the first switch 110 in the ON and/or otherwise enabled position. The first operating conditions 200 include the second switch 124 in either the ON and/or otherwise enabled position or in an OFF and/or otherwise disabled position.

In the first operating conditions 200, current flows along a first example current path 202, which is represented by arrows. The first current path 202 includes the power source 104, the inductor 108, and the first switch 110. In the first operating conditions 200, the current is building up in the inductor 108 while voltage stored by the first capacitor 126 and the second capacitor 128 is delivered and/or otherwise provided to the load 106.

Figure 3:
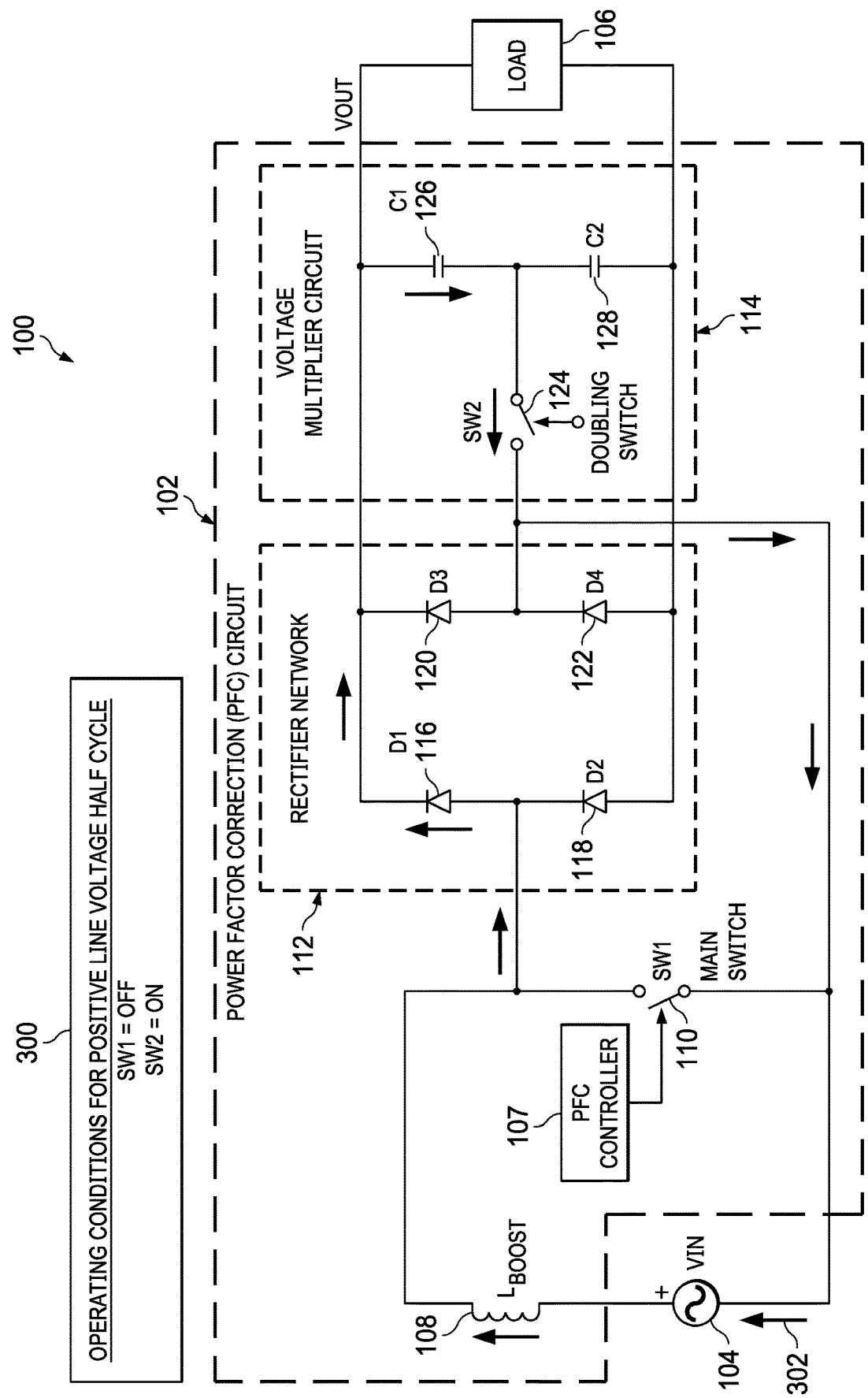
FIG. 3 is a schematic diagram of the first PFC circuit of FIG. 1 in second example operating conditions.

FIG. 3 is a schematic diagram of the first power conversion system 100 of FIG. 1 including the first PFC circuit 102 of FIG. 1 in second example operating conditions 300. The second operating conditions 300 are for a half cycle (e.g., a half switching cycle) of the first PFC circuit 102 in which the line voltage (e.g., a voltage generated by the power source 104) is positive. The second operating conditions 300 include the first switch 110 in the OFF position. The second operating conditions 300 include the second switch 124 in the ON position.

In the second operating conditions 300, current flows along a second example current path 302, which is represented by arrows. The second current path 302 includes the power source 104, the inductor 108, the first diode 116, the first capacitor 126, and the second switch 124. In the second operating conditions 300, the current from the inductor 108 is charging the first capacitor 126.

Figure 4:
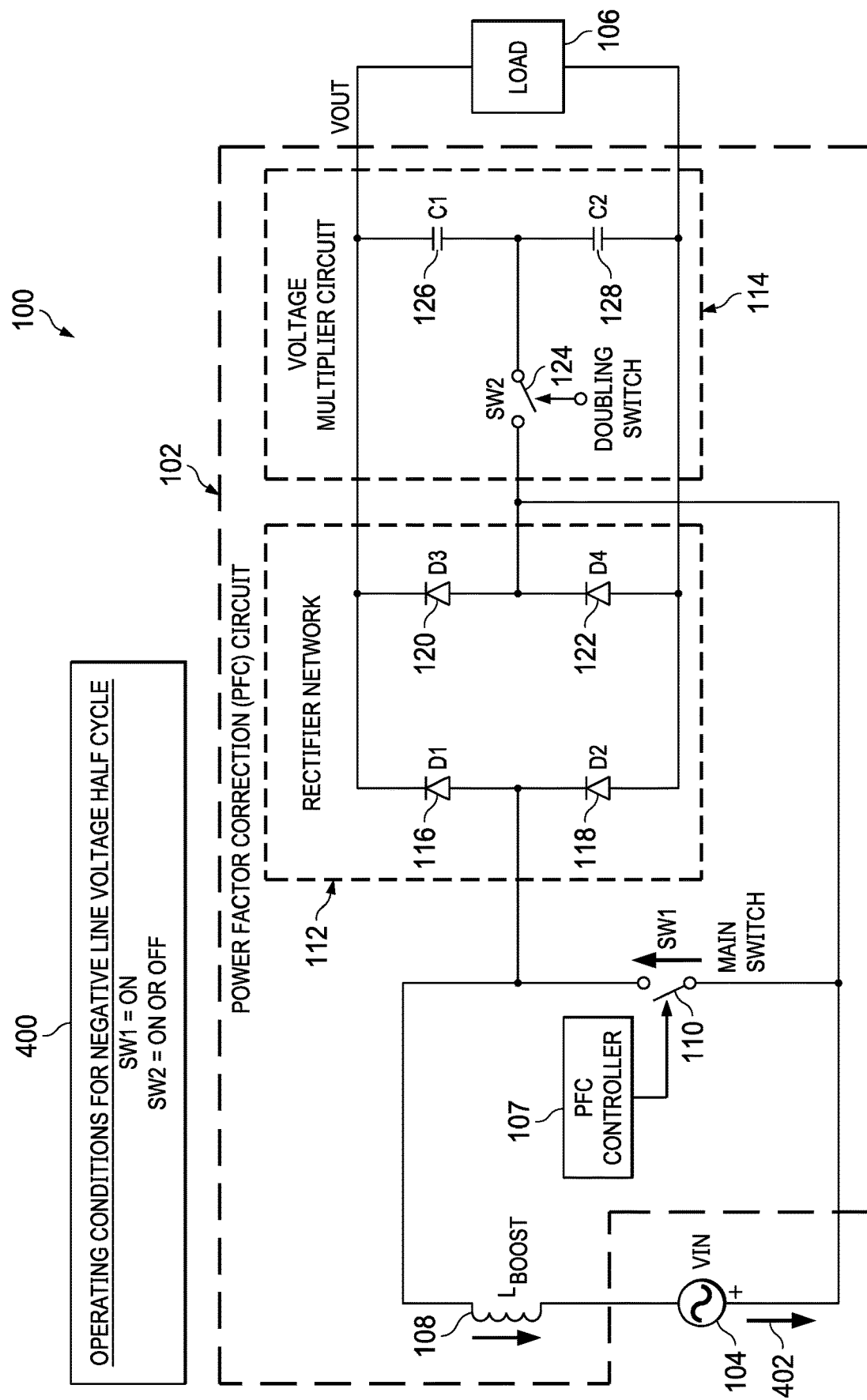
FIG. 4 is a schematic diagram of the first PFC circuit of FIG. 1 in third example operating conditions.

FIG. 4 is a schematic diagram of the first power conversion system 100 of FIG. 1 including the first PFC circuit 102 of FIG. 1 in third example operating conditions 400. The third operating conditions 400 are for a half cycle (e.g., a half switching cycle) of the first PFC circuit 102 in which the line voltage (e.g., a voltage generated by the power source 104) is negative. The third operating conditions 400 include the first switch 110 in the ON position. The third operating conditions 400 include the second switch 124 in either the ON or OFF position.

In the third operating conditions 400, current flows along a third example current path 402, which is represented by arrows. The third current path 402 includes the power source 104, the first switch 110, and the inductor 108. In the third operating conditions 400, the current is building up in the inductor 108 while voltage stored by the first capacitor 126 and the second capacitor 128 is delivered and/or otherwise provided to the load 106.

Figure 5:
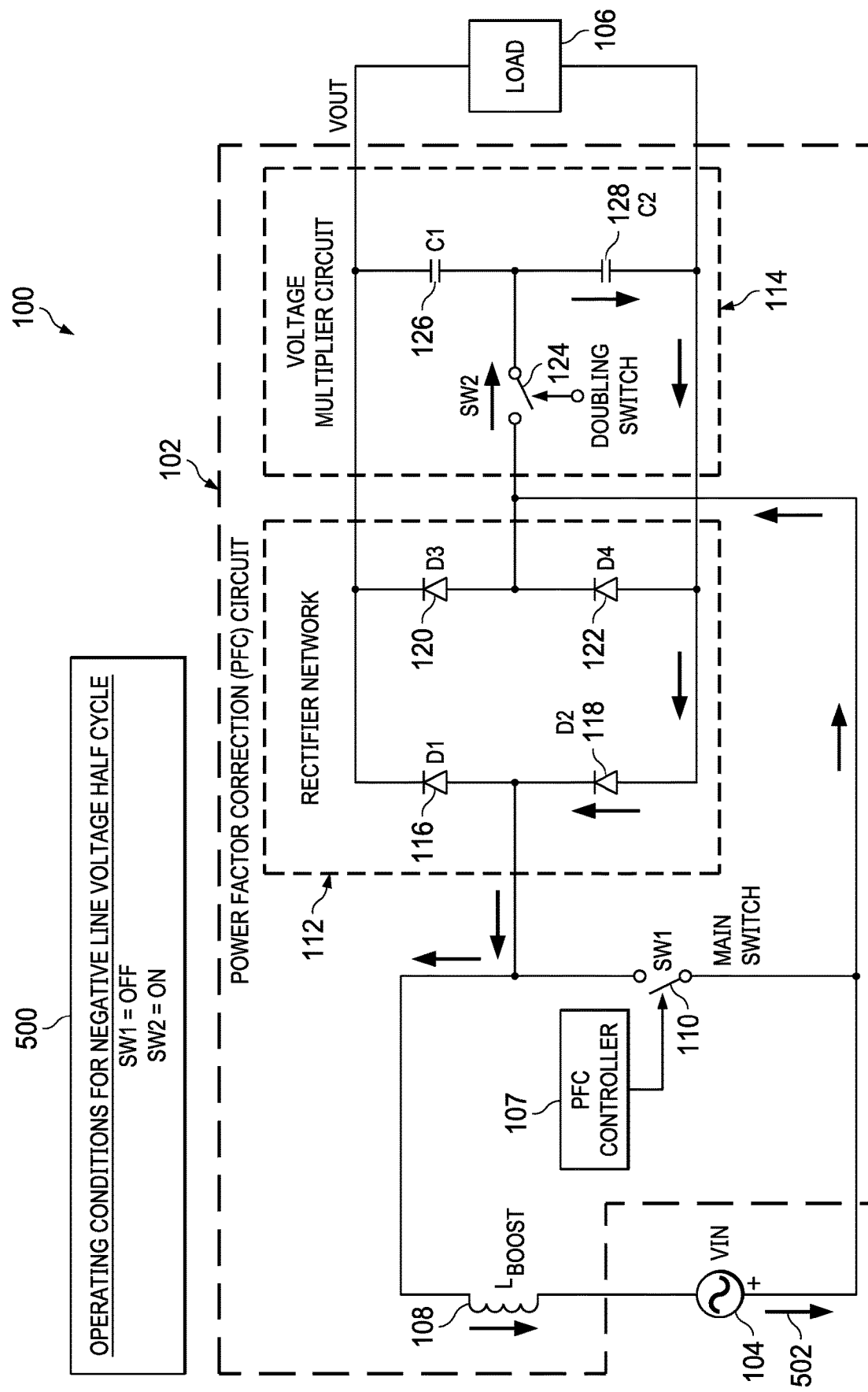
FIG. 5 is a schematic diagram of the first PFC circuit of FIG. 1 in fourth example operating conditions.

FIG. 5 is a schematic diagram of the first power conversion system 100 of FIG. 1 including the first PFC circuit 102 of FIG. 1 in fourth example operating conditions 500. The fourth operating conditions 500 are for a half cycle (e.g., a half switching cycle) of the first PFC circuit 102 in which the line voltage (e.g., a voltage generated by the power source 104) is negative. The fourth operating conditions 500 include the first switch 110 in the OFF position. The fourth operating conditions 500 include the second switch 124 in the ON position.

In the fourth operating conditions 500, current flows along a fourth example current path 502, which is represented by arrows. The fourth current path 502 includes the power source 104, the second switch 124, the second capacitor 128, the second diode 1128, and the inductor 108. In the fourth operating conditions 500, the current from the inductor 108 is charging the second capacitor 128.

Figure 6:
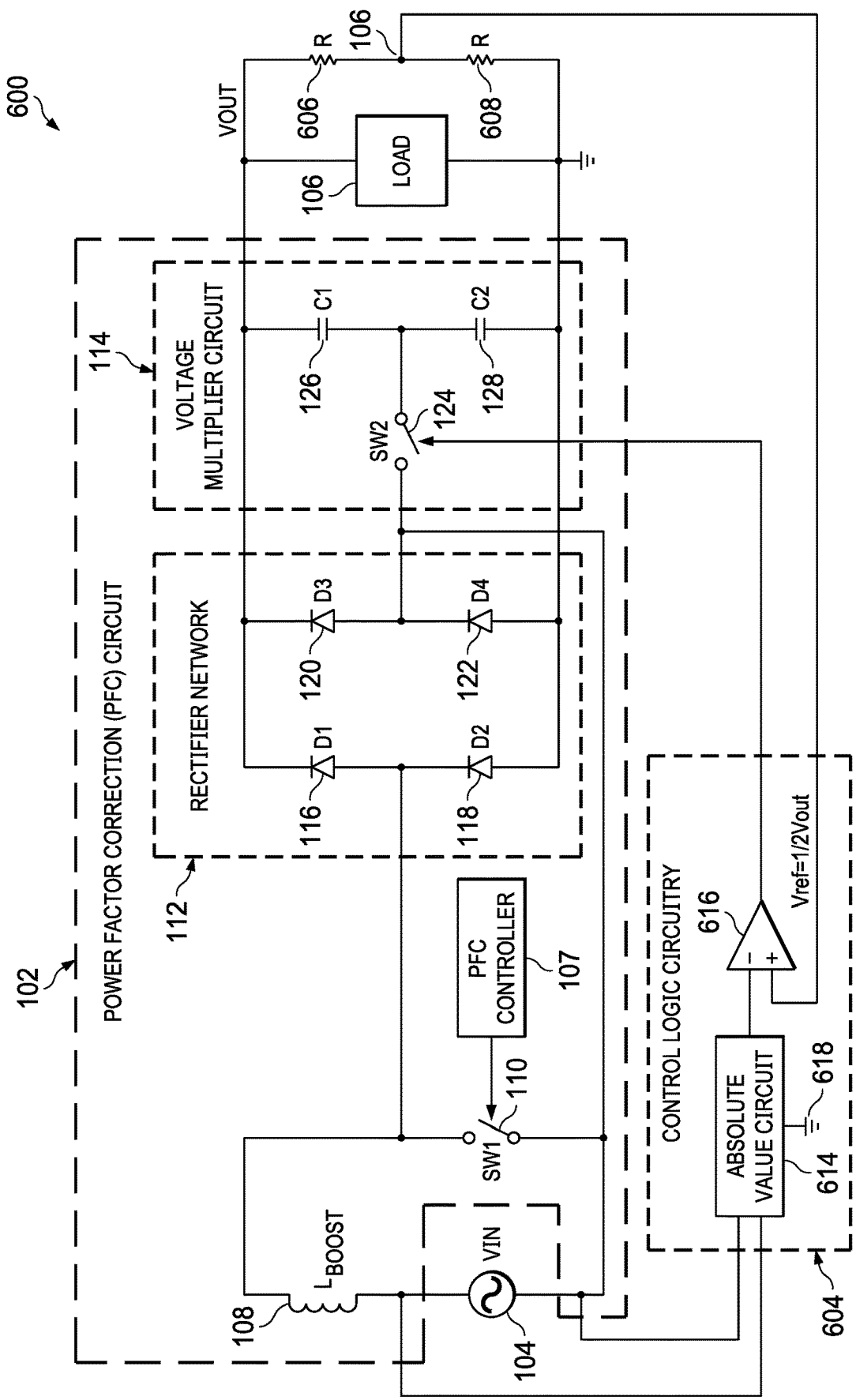
FIG. 6 is a schematic diagram of the first PFC circuit of FIG. 1 and first example control logic circuitry.

FIG. 6 is a schematic diagram of a second example power conversion system 600 including the first PFC circuit 102 of FIG. 1, the power source 104 of FIG. 1, the load 106 of FIG. 1, first example control logic circuitry 604, a first example resistor 606, and a second example resistor 608. The first resistor 606 has a first resistor terminal and a second resistor terminal. The second resistor 608 has a third resistor terminal and a fourth resistor terminal. The first resistor 606 and the second resistor 608 are coupled together in a voltage divider configuration to generate $V_{REF}$. For example, the first resistor 606 and the second resistor 608 can implement a voltage divider. In this example, $V_{REF}$ is half, approximately half, etc., of VOUT. For example, $V_{REF}$ can be approximately 200V DC. The first resistor terminal is coupled to: the first cathode, the third cathode, the first capacitor terminal, and the first load terminal. The fourth resistor terminal is coupled to: the second anode, the fourth anode, the fourth capacitor terminal, and the second load terminal. The second resistor terminal is coupled to the third resistor terminal at an example voltage reference terminal 620.

Alternatively, the first resistor 606, the second resistor 608, and/or the voltage reference terminal 620 may be part of the first control logic circuitry 604. For example, the first control logic circuitry 604 can be a controller that implements voltage dividing of VOUT. Alternatively, the second power conversion system 600 may not include the first resistor 606 and/or the second resistor 608. For example, the first resistor 606 may be adapted to be coupled to the first diode 116, the third diode 120, the first capacitor 126, and/or the load 106. The second resistor 608 may be adapted to be coupled to the second diode 118, the fourth diode 122, the second capacitor 128, and/or the load 106.

The second power conversion system 600 includes the first control logic circuitry 604 to control operation of the second switch 124 based on a comparison of a first voltage (e.g., VIN) to a second voltage (e.g., a voltage reference ($V_{REF}$)). The example implementation of the first control logic circuitry 604 in FIG. 6 is a logic circuit (e.g., a control logic circuit). Alternatively, the first control logic circuitry 604 may be implemented with one or more controllers, one or more hardware-implemented state machines, etc., and/or a combination thereof.

In this example, the first control logic circuitry 604 includes an example absolute value circuit 614 and an example comparator 616. The first control logic circuitry 604 includes the absolute value circuit 614 to provide an absolute value of VIN to the comparator 616. The first control logic circuitry 604 includes the comparator 616 to compare a first voltage, which is the absolute value of VIN, to a second voltage, which is a voltage reference ($V_{REF}$). In this example, $V_{REF}$ is equal to, approximately equal to, etc., half of VOUT.

In this example, the absolute value circuit 614 is an operational amplifier circuit. For example, the absolute value circuit 614 can include one or more operational amplifiers. In such examples, the absolute value circuit 614 can include one or more operational amplifiers and one or more diodes in conjunction with negative feedback circuitry to rectify VIN without generating an amplitude difference (e.g., a relatively significant or substantial amplitude difference) between VIN and the rectified voltage output. Alternatively, the absolute value circuit 614 may be an active rectifier circuit or a diode rectifier circuit.

A first input terminal (e.g., a first absolute value circuit input terminal) of the absolute value circuit 614 is coupled to the first voltage terminal of the power source 104. A second input terminal (e.g., a second absolute value circuit input terminal) of the absolute value circuit 614 is coupled to the second voltage terminal of the power source 104. A first output terminal (e.g., a first absolute value circuit output terminal) of the absolute value circuit 614 is coupled to a first input terminal (e.g., a first comparator input terminal) of the comparator 616. A second output terminal (e.g., a second absolute value circuit output terminal) of the absolute value circuit 614 is coupled to an example ground terminal 618. Alternatively, the second power conversion system 600 may not include the first control logic circuitry 604. For example, the absolute value circuit 614 may be adapted to be coupled to the first voltage terminal and the second voltage terminal. Alternatively, the first PFC circuit 102 may include the first control logic circuitry 604 or portion(s) thereof.

A second input terminal (e.g., a second comparator input terminal) of the comparator 616 is coupled to the example voltage reference terminal 620. An output terminal (e.g., a comparator output terminal) of the comparator 616 is coupled to the second gate terminal of the second switch 124.

In example operation, the absolute value circuit 614 receives VIN and provides an absolute value of VIN to the comparator 616. The comparator 616 asserts a logic high signal (e.g., a current and/or voltage representative of a digital '1') responsive to determining that the absolute value of VIN is less than $V_{REF}$. The second switch 124 is closed responsive to the assertion In example operation, the comparator 616 deasserts the logic high signal to a logic low signal (e.g., a current and/or voltage representative of a digital '0') responsive to determining that the absolute value of VIN is greater than $V_{REF}$. The second switch 124 is opened responsive to the deassertion. Advantageously, the comparator 616, and/or more generally the first control logic circuitry 604, can achieve DC drive control of the second switch 124.

Figure 7:
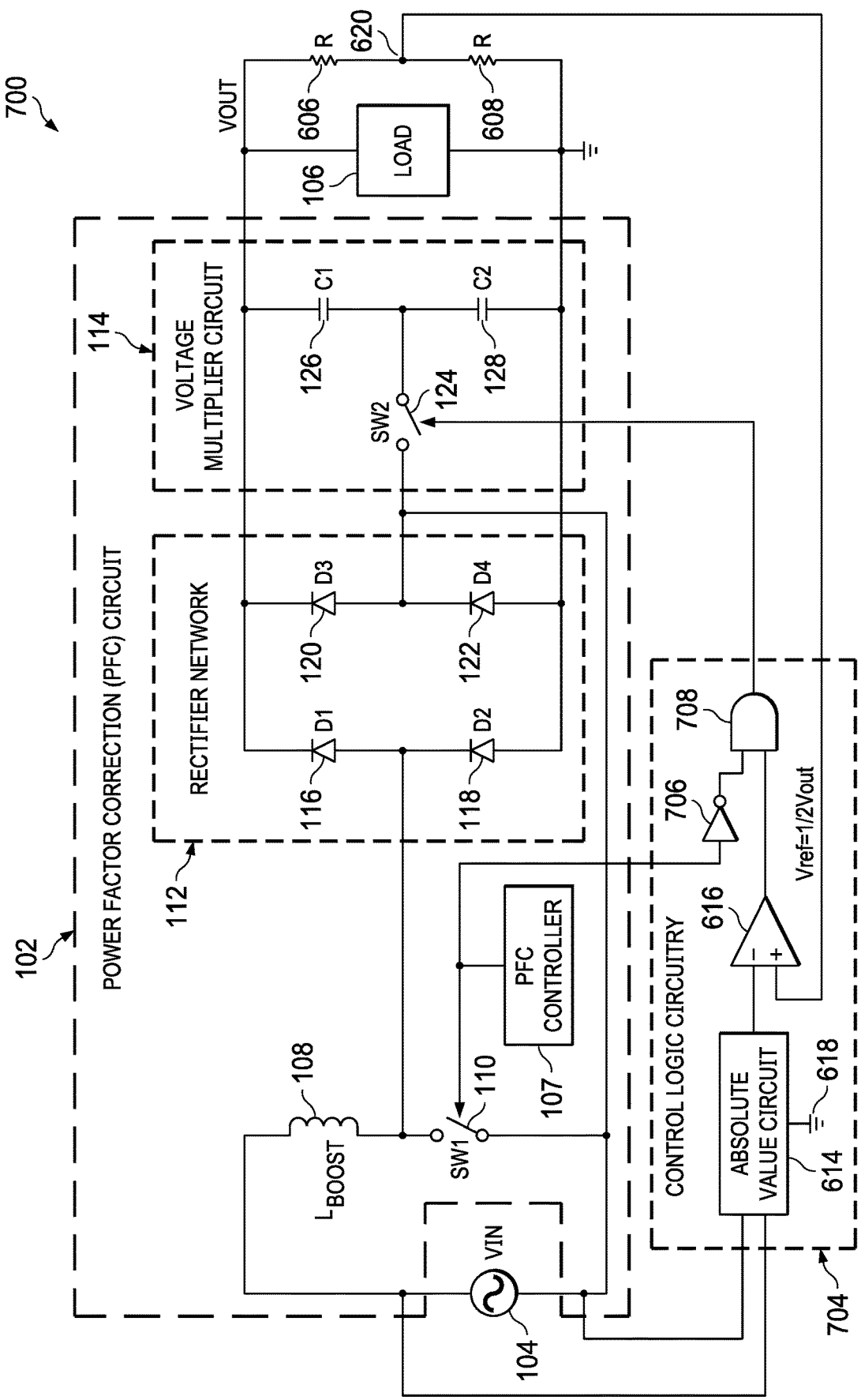
FIG. 7 is a schematic diagram of the first PFC circuit of FIG. 1 and second example control logic circuitry.

FIG. 7 is a schematic diagram of a third example power conversion system 700 including the first PFC circuit 102 of FIG. 1, the power source 104 of FIG. 1, the load 106 of FIG. 1, the first resistor 606 of FIG. 6, the second resistor 608 of FIG. 7, and second example control logic circuitry 704.

The second control logic circuitry 704 includes the absolute value circuit 614, the ground terminal 618, and the comparator 616 of FIG. 6. The second control logic circuitry 704 includes a first example logic gate 706 and a second example logic gate 708. Alternatively, the first resistor 606, the second resistor 608, and/or the voltage reference terminal 620 may be part of the second control logic circuitry 704. For example, the second control logic circuitry 704 can be a controller that implements voltage dividing of VOUT.

In this example, the first logic gate 706 is an inverter (such as an inverter logic gate, an inverting logic gate, etc.). In this example, the second logic gate 708 is an AND logic gate. The output terminal of the PFC controller 107 is coupled to an input terminal (such as an inverter input terminal, a gate input, etc.) of the first logic gate 706. In this example, the input terminal of the first logic gate 706 is a controller input. An output terminal (such as an inverter output terminal, a gate output, etc.) of the first logic gate 706 is coupled to a first input terminal (such as a first AND input terminal, a first gate input, etc.) of the second logic gate 708. A second input terminal (such as a second AND input terminal, a second gate input, etc.) of the second logic gate 708 is coupled to the output terminal of the comparator 616. An output terminal (such as an AND output terminal, a gate output, etc.) of the second logic gate 708 is coupled to the second gate terminal of the second switch 124. For example, the second logic gate 708 is configured to output an AND output from the output terminal. Alternatively, the third power conversion system 700 may not include the second control logic circuitry 704. For example, the absolute value circuit 614 may be adapted to be coupled to the first voltage terminal and the second voltage terminal. In such examples, the second logic gate 708 may be adapted to be coupled to the second gate terminal.

In example operation, the absolute value circuit 614 receives VIN and provides an absolute value of VIN to the comparator 616. The comparator 616 asserts the logic high signal responsive to the comparator 616 determining that the absolute value of VIN is less than $V_{REF}$. The comparator 616 deasserts the logic high signal to the logic low signal responsive to determining that the absolute value of VIN is greater than $V_{REF}$.

In example operation, the PFC controller 107 is configured to provide a logic high signal to the first logic gate 706 responsive to closing the first switch 110. The first logic gate 706 provides a logic low signal to the second logic gate 708 responsive to receiving the logic high signal from the PFC controller 107. The second logic gate 708 outputs a logic low signal responsive to receiving the logic low signal from the first logic gate 706. The second switch 124 is opened responsive to the second logic gate 708 outputting the logic low signal.

In example operation, the PFC controller 107 is configured to provide a logic low signal to the first logic gate 706 responsive to opening the first switch. The first logic gate 706 provides a logic high signal to the second logic gate 708 responsive to receiving the logic low signal from the PFC controller 107. The second logic gate 708 outputs a logic high signal responsive to receiving the logic high signal from the first logic gate 706 and receiving a logic high signal from the comparator 616. The second switch 124 is closed responsive to the second logic gate 708 outputting the logic high signal.

Advantageously, the first logic gate 706, the second logic gate 708, and/or more generally the second control logic circuitry 704, can achieve pulse drive control of the second switch 124. For example, a pulse transformer or any other type of pulse drive control circuit may be coupled between the output terminal of the second logic gate 708 and the second gate terminal to achieve pulse drive control.

While an example manner of implementing the first control logic circuitry 604 is illustrated in FIG. 6 and an example manner of implementing the second control logic circuitry 704 is illustrated in FIG. 7, one or more of the elements, processes and/or devices illustrated in FIGS. 6 and/or 7 may be combined, divided, rearranged, omitted, eliminated and/or implemented in any other way. Further, the absolute value circuit 614, the comparator 616, and/or, more generally, the first control logic circuitry 604 of FIG. 6, and/or the absolute value circuit 614, the comparator 616, the first logic gate 706, the second logic gate 708, and/or, more generally, the second control logic circuitry 704 of FIG. 7, may be implemented by hardware, software, firmware and/or any combination of hardware, software and/or firmware. Thus, for example, any of the absolute value circuit 614, the comparator 616, and/or, more generally, the first control logic circuitry 604 of FIG. 6, and/or the absolute value circuit 614, the comparator 616, the first logic gate 706, the second logic gate 708, and/or, more generally, the second control logic circuitry 704 of FIG. 7, could be implemented by one or more analog or digital circuit(s), logic circuits, programmable processor(s), programmable controller(s), graphics processing unit(s) (GPU(s)), DSP(s), ASIC(s), PLD(s), and/or FPLD(s). When reading any of the apparatus or system claims of this patent to cover a purely software and/or firmware implementation, at least one of the absolute value circuit 614 and/or the comparator 616 of FIG. 6, and/or the absolute value circuit 614, the comparator 616, the first logic gate 706, and/or the second logic gate 708 of FIG. 7 is/are hereby expressly defined to include a non-transitory computer readable storage device or storage disk such as a memory, a digital versatile disk (DVD), a compact disk (CD), a Blu-ray disk, etc., including the software and/or firmware. Further still, the first control logic circuitry 604 of FIG. 6 and/or the second control logic circuitry 704 of FIG. 7 may include one or more elements, processes and/or devices in addition to, or instead of, those illustrated in FIGS. 6 and/or 7, and/or may include more than one of any or all of the illustrated elements, processes and devices.

Figure 8:
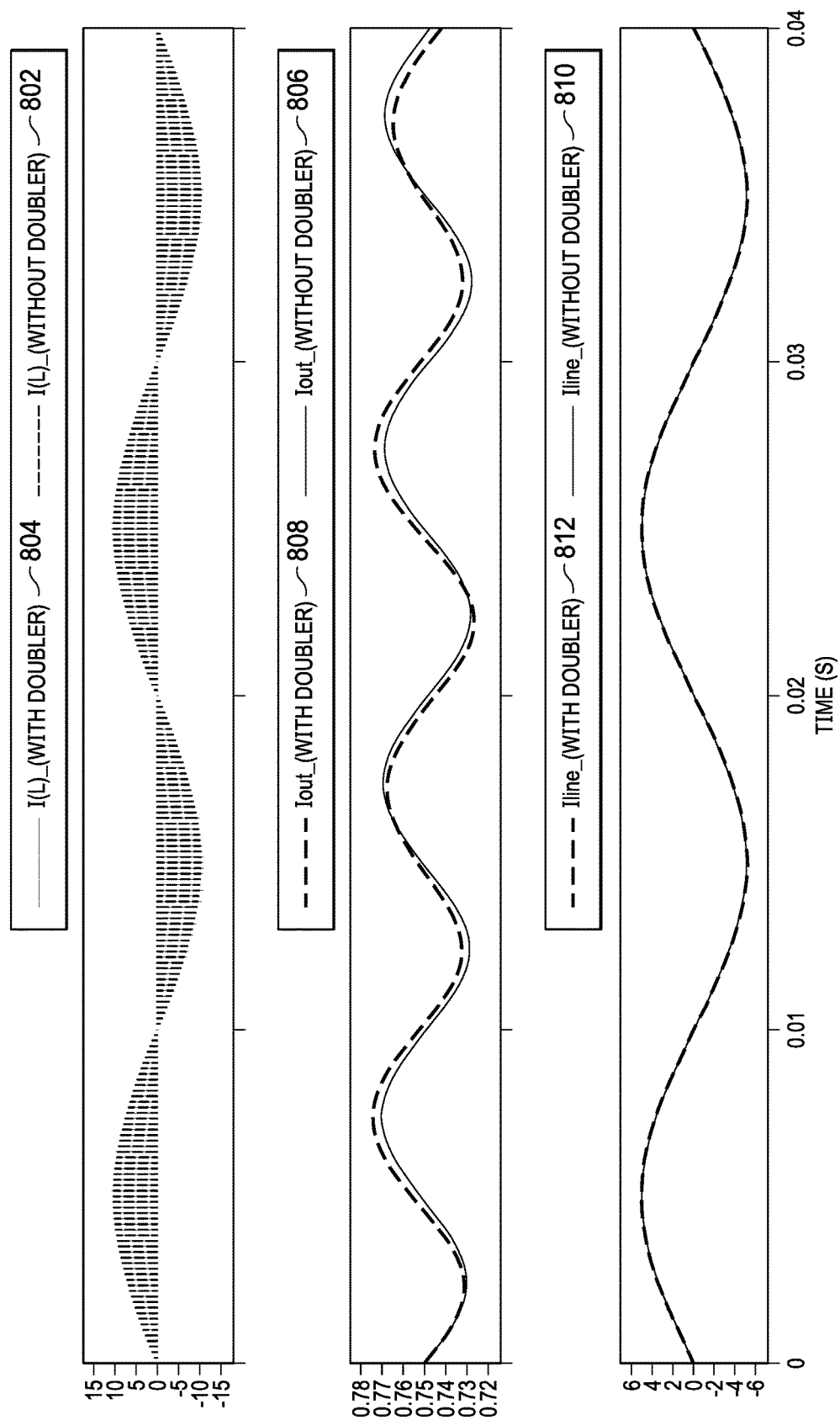
FIG. 8 depicts first example waveforms of the first PFC circuit of FIGS. 1, 6, and/or 7.
Figure 14:
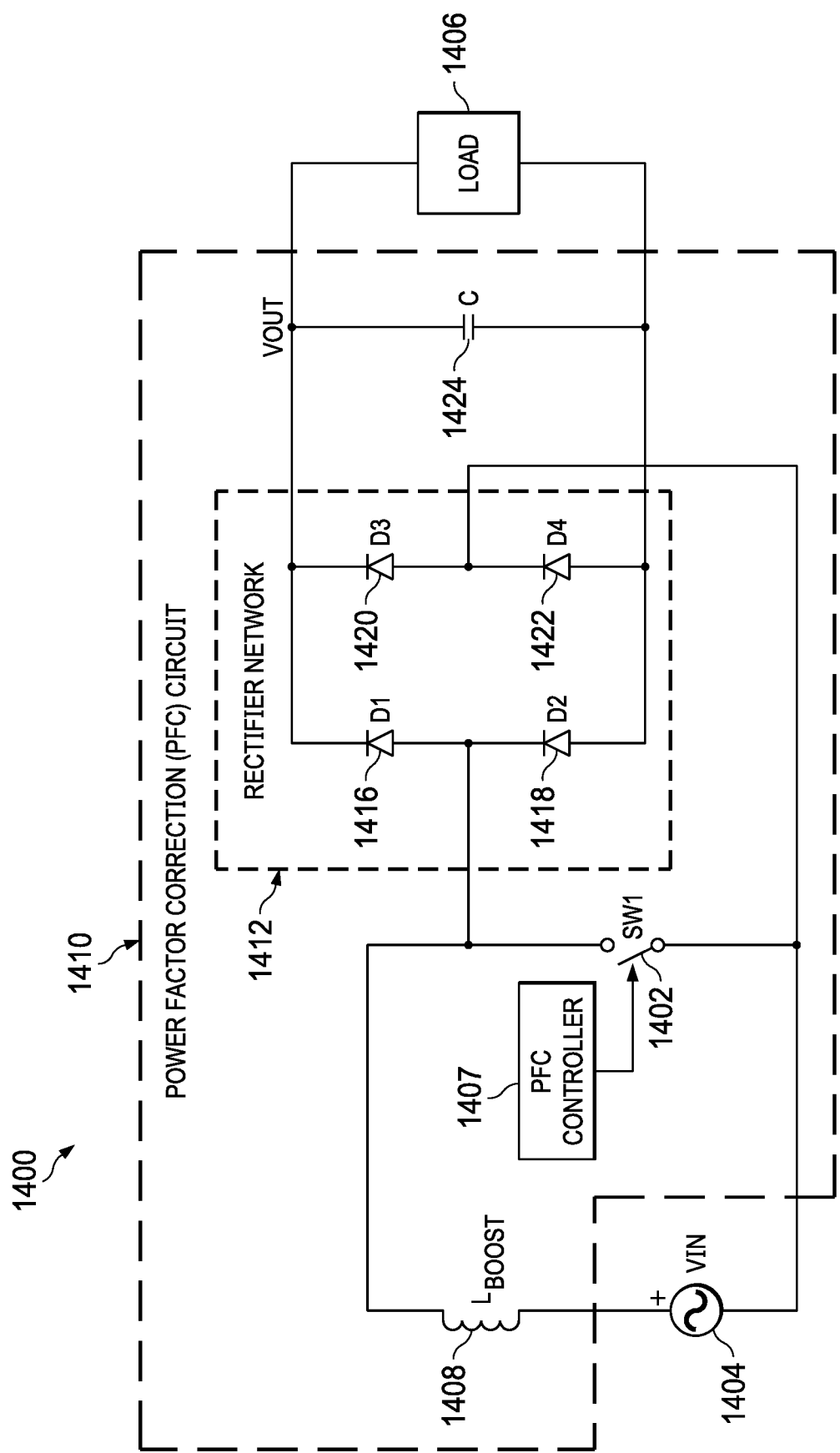
FIG. 14 is a schematic diagram of a second example PFC circuit.

FIG. 8 depicts first example waveforms 802, 804, 806, 808, 810, 812 of the first PFC circuit 102 of FIGS. 1-7, and/or a fourth power conversion system 1400 of FIG. 14. The first waveforms 802, 804, 806, 808, 810, 812 include a first example waveform 802, a second example waveform 804, a third example waveform 806, a fourth example waveform 808, a fifth example waveform 810, and a sixth example waveform 812. In this example, the first waveforms 802, 804, 806, 808, 810, 812 are generated responsive to a power source having a voltage (such as an input voltage, VIN, etc.) of 85V AC.

The first waveform 802 is a waveform of current through an inductor in a power conversion system that does not include the voltage multiplier circuit 114 of FIGS. 1-7, such as the fourth power conversion system 1400. The second waveform 804 is a waveform of current through the inductor 108 of FIGS. 1-7. Advantageously, as depicted by a comparison of the first waveform 802 and the second waveform 804, the voltage multiplier circuit 114 of FIGS. 1-7 causes the inductor 108 of FIGS. 1-7 to operate in a substantially similar manner, irrespective of whether the voltage multiplier circuit 114 is part of the power conversion system, while the voltage multiplier circuit 114 reduces inductor core loss, inductor winding AC resistance, and inductor loss from the inductor 108.

The third waveform 806 is a waveform of current delivered to a load in a power conversion system that does not include the voltage multiplier circuit 114 of FIGS. 1-7, such as the fourth power conversion system 1400. The fourth waveform 808 is a waveform of current delivered to the load 106 of FIGS. 1-7. Advantageously, as depicted by a comparison of the third waveform 806 and the fourth waveform 808, the voltage multiplier circuit 114 of FIGS. 1-7 causes the current delivered to the load to be substantially similar, irrespective of whether the voltage multiplier circuit 114 is part of the power conversion system, while the voltage multiplier circuit 114 reduces inductor core loss, inductor winding AC resistance, and inductor loss from the inductor 108. The fifth waveform 810 is a waveform of current flowing from a power source in a power conversion system that does not include the voltage multiplier circuit 114 of FIGS. 1-7, such as the fourth power conversion system 1400. The sixth waveform 812 is a waveform of current flowing from the power source 104 of FIGS. 1-7.

Advantageously, as depicted by a comparison of the fifth waveform 810 and the sixth waveform 812, the voltage multiplier circuit 114 of FIGS. 1-7 causes the current flowing from the power source 104 of FIGS. 1-7 to be substantially similar, irrespective of whether the voltage multiplier circuit 114 is part of the power conversion system, while the voltage multiplier circuit 114 reduces inductor core loss, inductor winding AC resistance, and inductor loss from the inductor 108.

Figure 9:
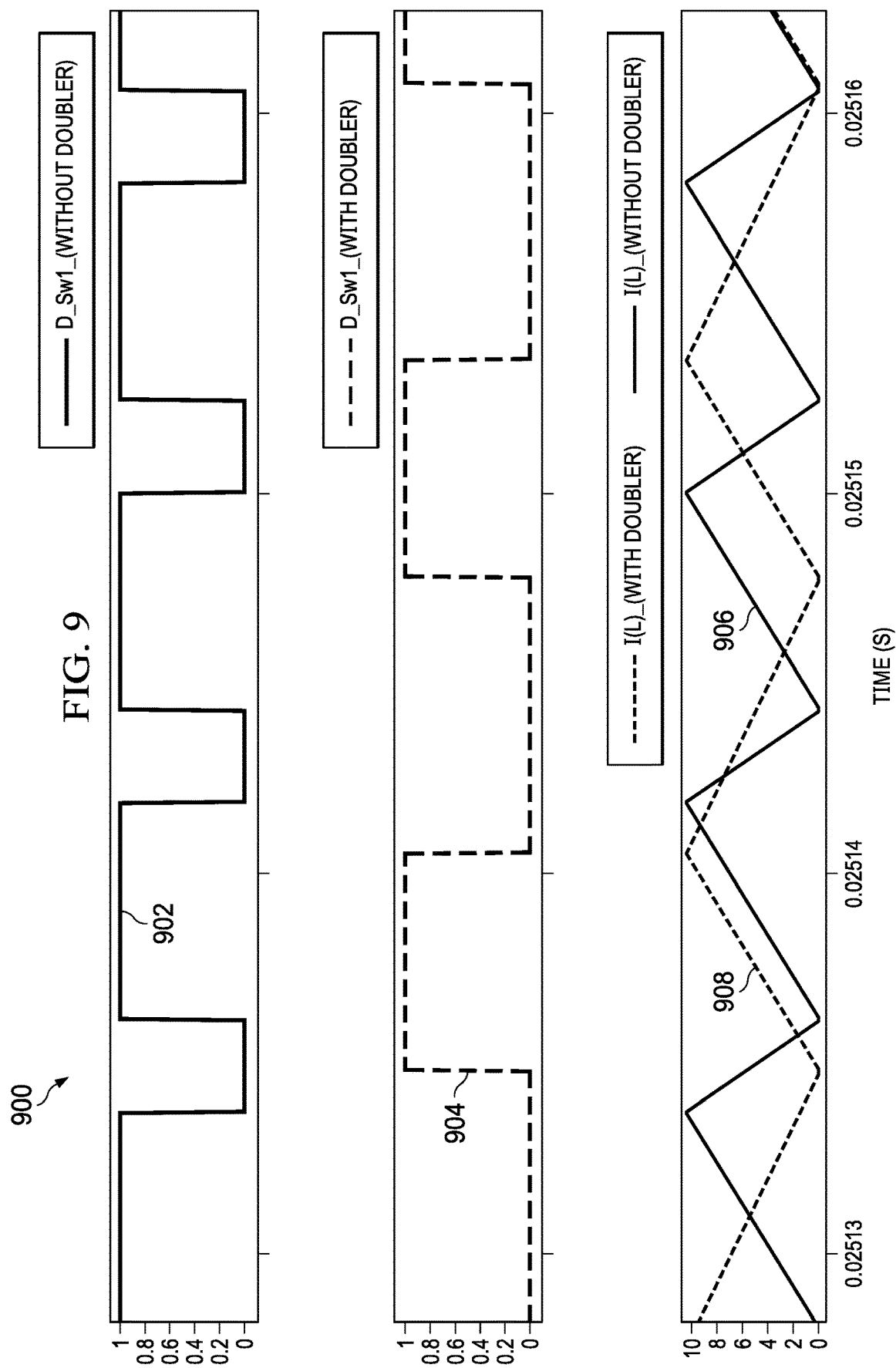
FIG. 9 is a first example timing diagram including second example waveforms of the first PFC circuit of FIGS. 1, 6, and/or 7.

FIG. 9 is a first example timing diagram 900 including second example waveforms 902, 904, 906, 908 of the first PFC circuit 102 of FIGS. 1-7, and/or the fourth power conversion system 1400 of FIG. 14. The second waveforms 902, 904, 906, 908 include a first example waveform 902, a second example waveform 904, a third example waveform 906, and a fourth example waveform 908. In this example, the second waveforms 902, 904, 906, 908 are generated responsive to a power source having a voltage (such as an input voltage, VIN, etc.) of 85V AC.

The first waveform 902 is a waveform of a first control signal of a first switch in a power conversion system that does not include the voltage multiplier circuit 114 of FIGS. 1-7, such as the fourth power conversion system 1400. For example, the first control signal can be a signal provided to a first gate terminal of a first switch 1402 of FIG. 14 to turn on the first switch 1402, turn off the first switch 1402, etc. In such examples, the first switch 1402 can be turned on responsive to the first waveform 902 having a value of 1 (e.g., a digital '1') and can be turned off responsive to the first waveform 902 having a value of 0 (e.g., a digital '0'). The second waveform 904 is a waveform of a second control signal of the first switch 110 of FIGS. 1-7. For example, the second control signal can be a signal provided to the first gate terminal of the first switch 110 to turn on the first switch 110, turn off the first switch 110, etc. In such examples, the first switch 110 can be turned on responsive to the second waveform 904 having a value of 1 (e.g., a digital '1') and can be turned off responsive to the second waveform 904 having a value of 0 (e.g., a digital '0'). The third waveform 906 is a waveform of current through an inductor in a power conversion system that does not include the voltage multiplier circuit 114 of FIGS. 1-7, such as the fourth power conversion system 1400. The fourth waveform 908 is a waveform of current through the inductor 108 of FIGS. 1-7.

Advantageously, the voltage multiplier circuit 114 of FIGS. 1-7 enables the off time of the first switch 110 of FIG. 1 to increase compared to the first switch 1402 of FIG. 14. Advantageously, the increase in off time of the first switch 110 can enable a decrease in a switching frequency of the first switch. For example, the voltage multiplier circuit 114 can make the first switch 110 of FIG. 1 have a smaller switching frequency than the first switch 1402 of FIG. 14. In such examples, the voltage multiplier circuit 114 can decrease inductor core loss, inductor winding AC resistance, and inductor loss from the inductor 108 of FIGS. 1-7.

Figure 10:
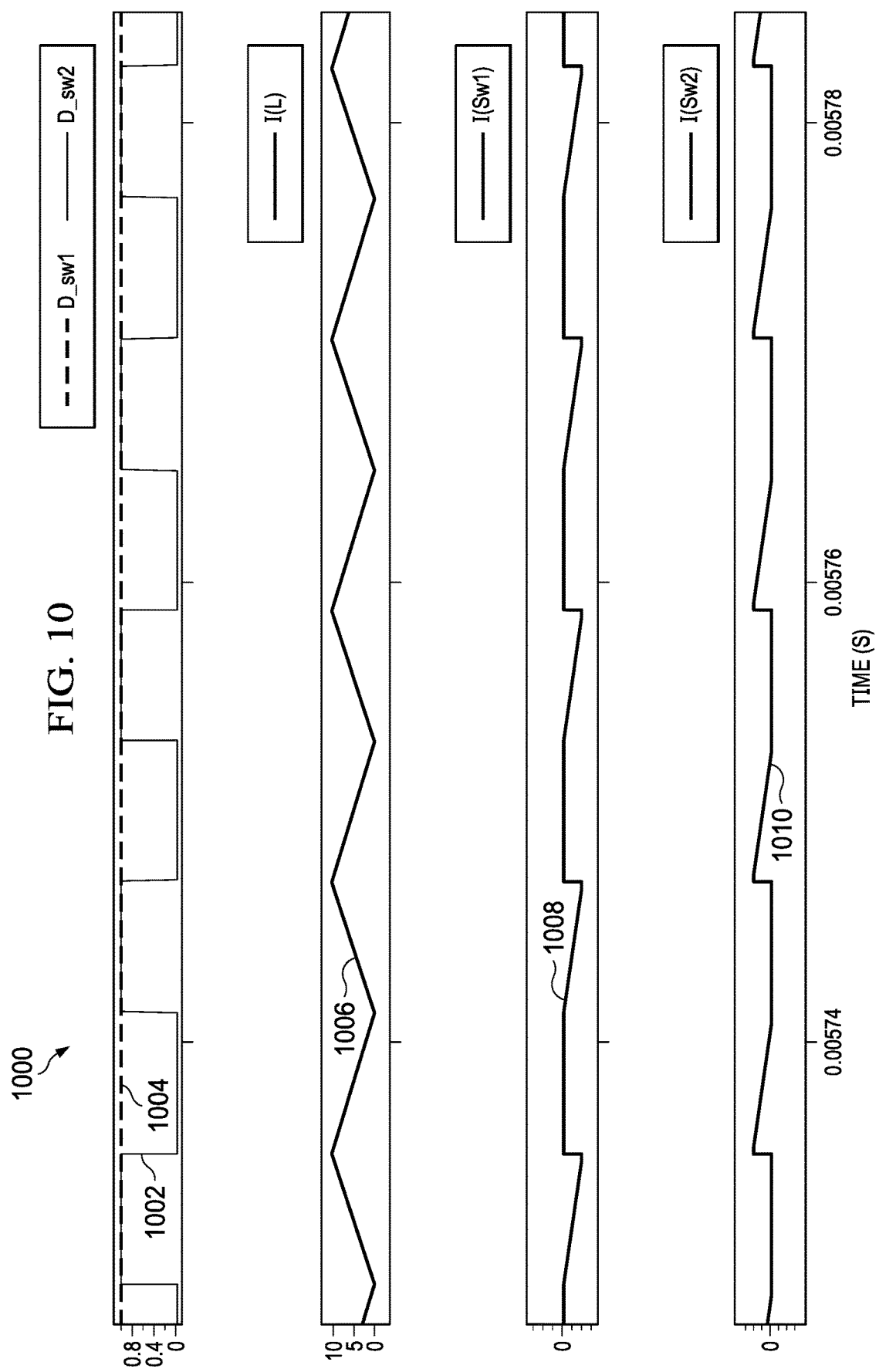
FIG. 10 is a second example timing diagram including third example waveforms of the first PFC circuit of FIGS. 1 and/or 6.

FIG. 10 is a second example timing diagram 1000 including third example waveforms 1002, 1004, 1006, 1008, 1010 of the first PFC circuit 102 of FIGS. 1 and/or 6. The third waveforms 1002, 1004, 1006, 1008, 1010 include a first example waveform 1002, a second example waveform 1004, a third example waveform 1006, a fourth example waveform 1008, and a fifth example waveform 1010. In this example, the third waveforms 1002, 1004, 1006, 1008, 1010 are generated responsive to a power source having a voltage (such as an input voltage, VIN, etc.) of 85V AC.

The first waveform 1002 is a waveform of a first control signal of the first switch 110 of FIGS. 1 and/or 6. For example, the first control signal can be delivered to the first gate terminal of the first switch 110. The second waveform 1004 is a waveform of a second control signal of the second switch 124 of FIGS. 1 and/or 6. For example, the second control signal can be delivered to the second gate terminal of the second switch 124. The third waveform 1006 is a waveform of a current flowing through the inductor 108 of FIGS. 1 and/or 6. The fourth waveform 1008 is a waveform of current flowing through the first switch 110. The fifth waveform 1010 is a waveform of current flowing through the second switch 124.

Advantageously, the first control logic circuitry 604 can achieve DC drive control of the voltage multiplier circuit 114 of FIGS. 1 and/or 6. Advantageously, the DC drive control can facilitate operation of the first PFC circuit 102 with the second switch 124 fixed in the enabled position. Advantageously, cost of manufacturing the first PFC circuit 102 can be reduced by maintaining the second switch 124 in the enabled position or, in some examples, by replacing the second switch 124 with an input voltage range select switch.

Figure 11:
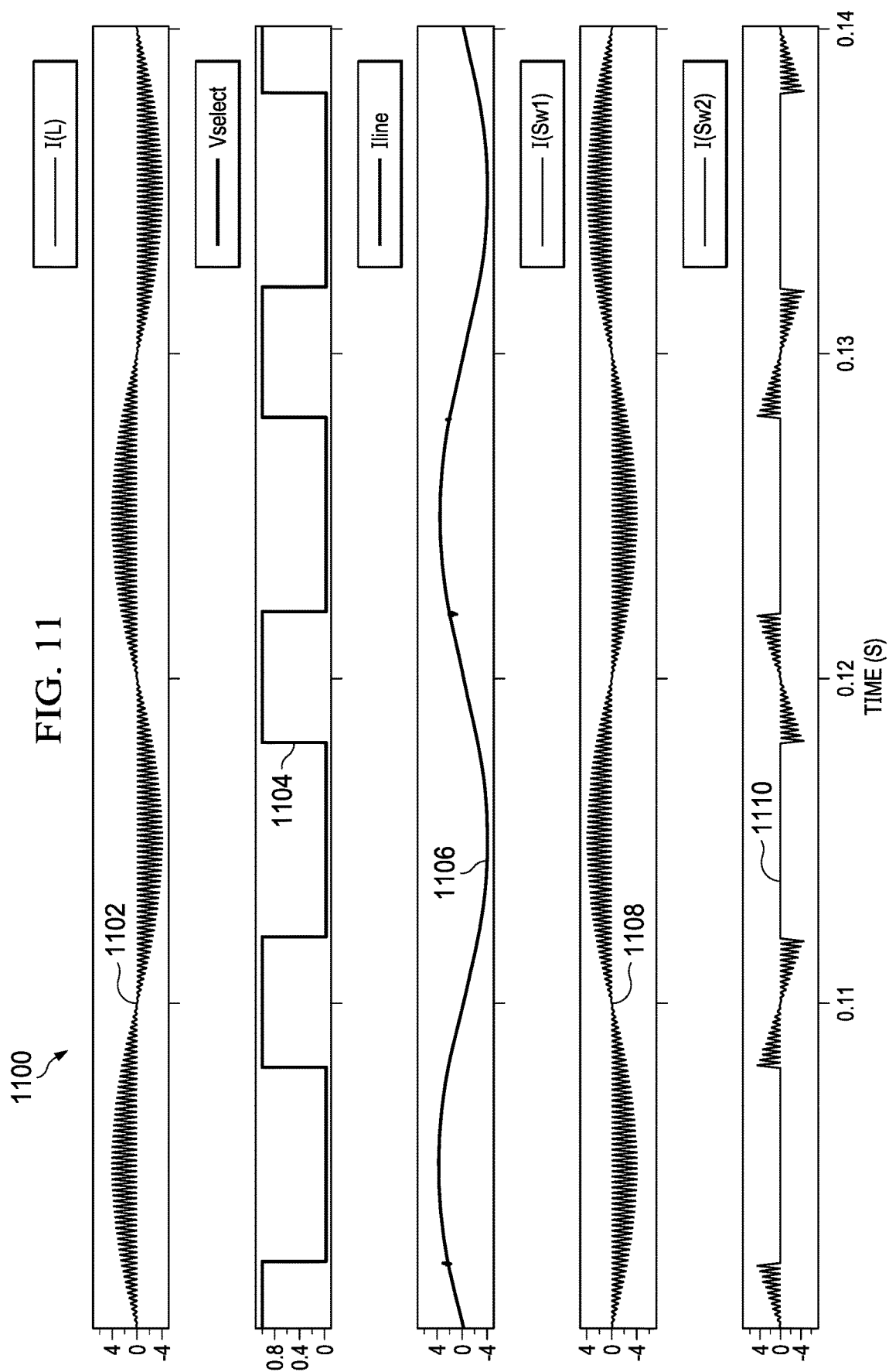
FIG. 11 is a third example timing diagram including fourth example waveforms of the first PFC circuit of FIGS. 1 and/or 6.

FIG. 11 is a third example timing diagram 1100 including fourth example waveforms 1102, 1104, 1106, 1108, 1110 of the first PFC circuit 102 of FIGS. 1 and/or 6. The fourth waveforms 1102, 1104, 1106, 1108, 1110 include a first example waveform 1102, a second example waveform 1104, a third example waveform 1106, a fourth example waveform 1108, and a fifth example waveform 1110. In this example, the fourth waveforms 1102, 1104, 1106, 1108, 1110 are generated responsive to a power source having a voltage (such as an input voltage, VIN, etc.) of 220V AC. For example, the fourth waveforms 1102, 1104, 1106, 1108, 1110 can be generated responsive to the first power conversion system 100 and/or the second power conversion system 600 operating in transition mode.

The first waveform 1102 is a waveform of a current flowing through the inductor 108 of FIGS. 1 and/or 6. The second waveform 1104 is a waveform of a control signal (such as a voltage select signal, a voltage select control signal, etc.). For example, the control signal can be a control signal of the second switch 124 of FIGS. 1 and/or 6. In such examples, the control signal can be delivered to the second gate terminal of the second switch 124. In some such examples, the second switch 124 can be and/or otherwise operate as a input voltage range select switch. The third waveform 1106 is a waveform of current of the power source 104 of FIGS. 1 and/or 6. The fourth waveform 1108 is a waveform of current flowing through the first switch 110. The fifth waveform 1110 is a waveform of current flowing through the second switch 124.

Advantageously, the voltage multiplier circuit 114 of FIGS. 1 and/or 6 can provide a voltage multiplier assist responsive to the control signal being enabled (e.g., having a value corresponding to a digital '1'), which causes current to flow through the second switch 124. Advantageously, the voltage multiplier circuit 114 can provide voltage doubling when the input voltage is 220V AC, 240V AC, etc., to eliminate the voltage runway caused by unequal leakage currents of output capacitors, such as the first capacitor 126 and the second capacitor 128 of FIGS. 1 and/or 6. Advantageously, the voltage multiplier circuit 114 can provide voltage doubling of the input voltage to the load 106 while the first power conversion system 100 and/or the second power conversion system 600 is in and/or otherwise operating in transition mode.

Figure 12:
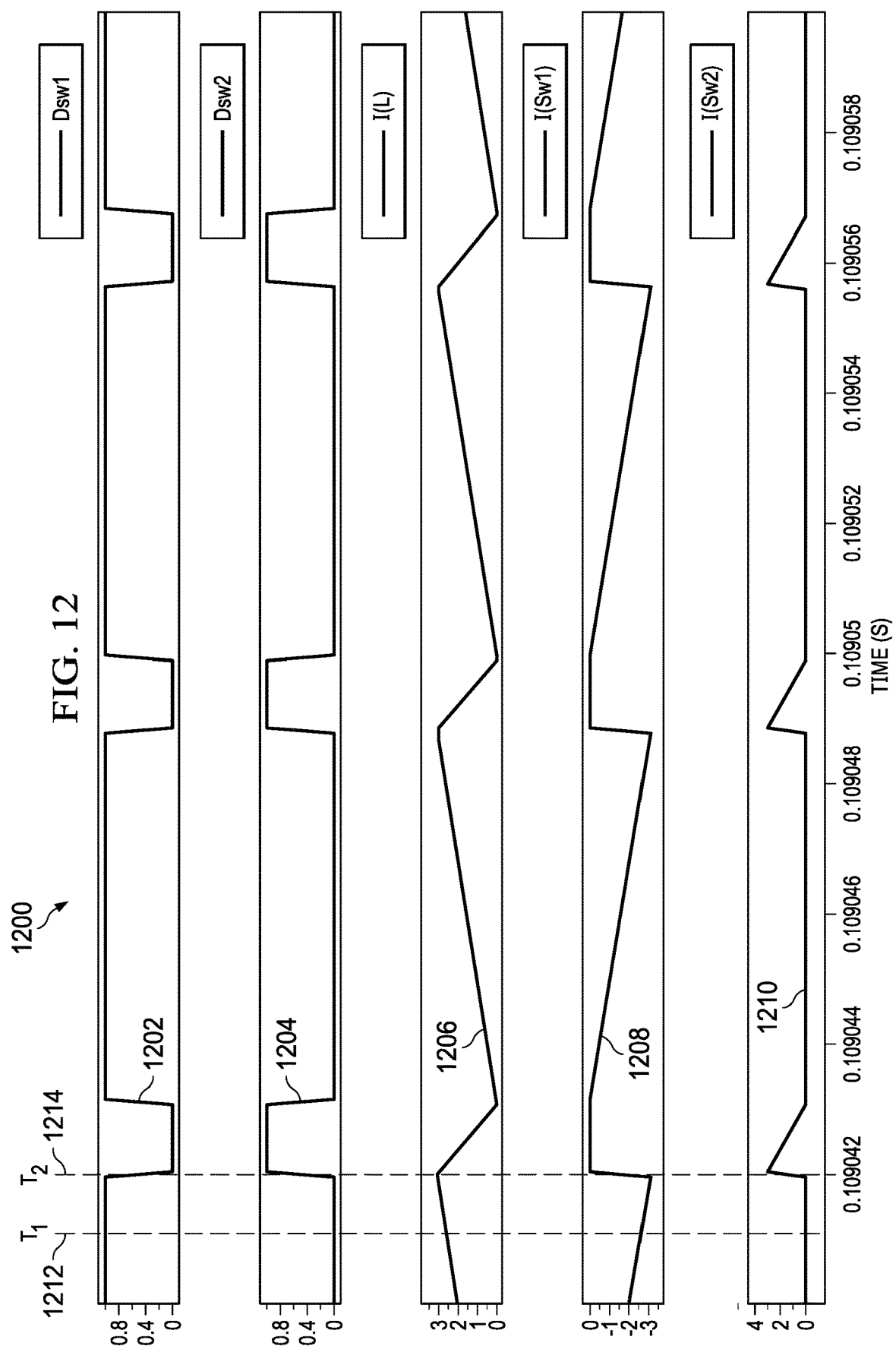
FIG. 12 is a fourth example timing diagram including fifth example waveforms of the first PFC circuit of FIGS. 1 and/or 7.

FIG. 12 is a fourth example timing diagram 1200 including fifth example waveforms 1202, 1204, 1206, 1208, 1210 of the first PFC circuit 102 of FIGS. 1 and/or 7. The fifth waveforms 1202, 1204, 1206, 1208, 1210 include a first example waveform 1202, a second example waveform 1204, a third example waveform 1206, a fourth example waveform 1208, and a fifth example waveform 1210. In this example, the fifth waveforms 1202, 1204, 1206, 1208, 1210 are generated responsive to a power source having a voltage (such as an input voltage, VIN, etc.) of 85V AC.

The first waveform 1202 is a waveform of a first control signal of the first switch 110 of FIGS. 1 and/or 7. For example, the first control signal can be a signal provided to the first gate terminal of the first switch 110 to turn on the first switch 110, turn off the first switch 110, etc. In such examples, the first switch 110 can be turned on responsive to the first waveform 1202 having a value of 1 (e.g., a digital '1') and can be turned off responsive to the first waveform 1202 having a value of 0 (e.g., a digital '0'). The second waveform 1204 is a waveform of a second control signal of the second switch 124 of FIGS. 1 and/or 7. For example, the second control signal can be a signal provided to the second gate terminal of the second switch 124 to turn on the second switch 124, turn off the second switch 124, etc. In such examples, the second switch 124 can be turned on responsive to the second waveform 1204 having a value of 1 (e.g., a digital '1') and can be turned off responsive to the second waveform 1204 having a value of 0 (e.g., a digital '0'). The third waveform 1206 is a waveform of current through the inductor 108 of FIGS. 1 and/or 7. The fourth waveform 1208 is a waveform of current flowing through the first switch 110. The fifth waveform 1210 is a waveform of current flowing through the second switch 124.

In example operation, at a first example time ($T_1$) 1212, the first switch 110 is enabled causing current to flow through the first switch 110 and causing current to increase through the inductor 108. At the first time 1212, the second switch 124 is disabled causing current not to flow through the second switch 124. At a second example time ($T_2$) 1214, the first switch 110 is turned off causing current to cease flowing through the first switch 110 and cause current to decrease through the inductor 108. At the second time 1214, the second switch 124 is turned on causing current to flow through the second switch 124. Advantageously, the second control logic circuitry 704 can achieve pulse drive control of the voltage multiplier circuit 114 as demonstrated in the fourth timing diagram 1200.

Figure 13:
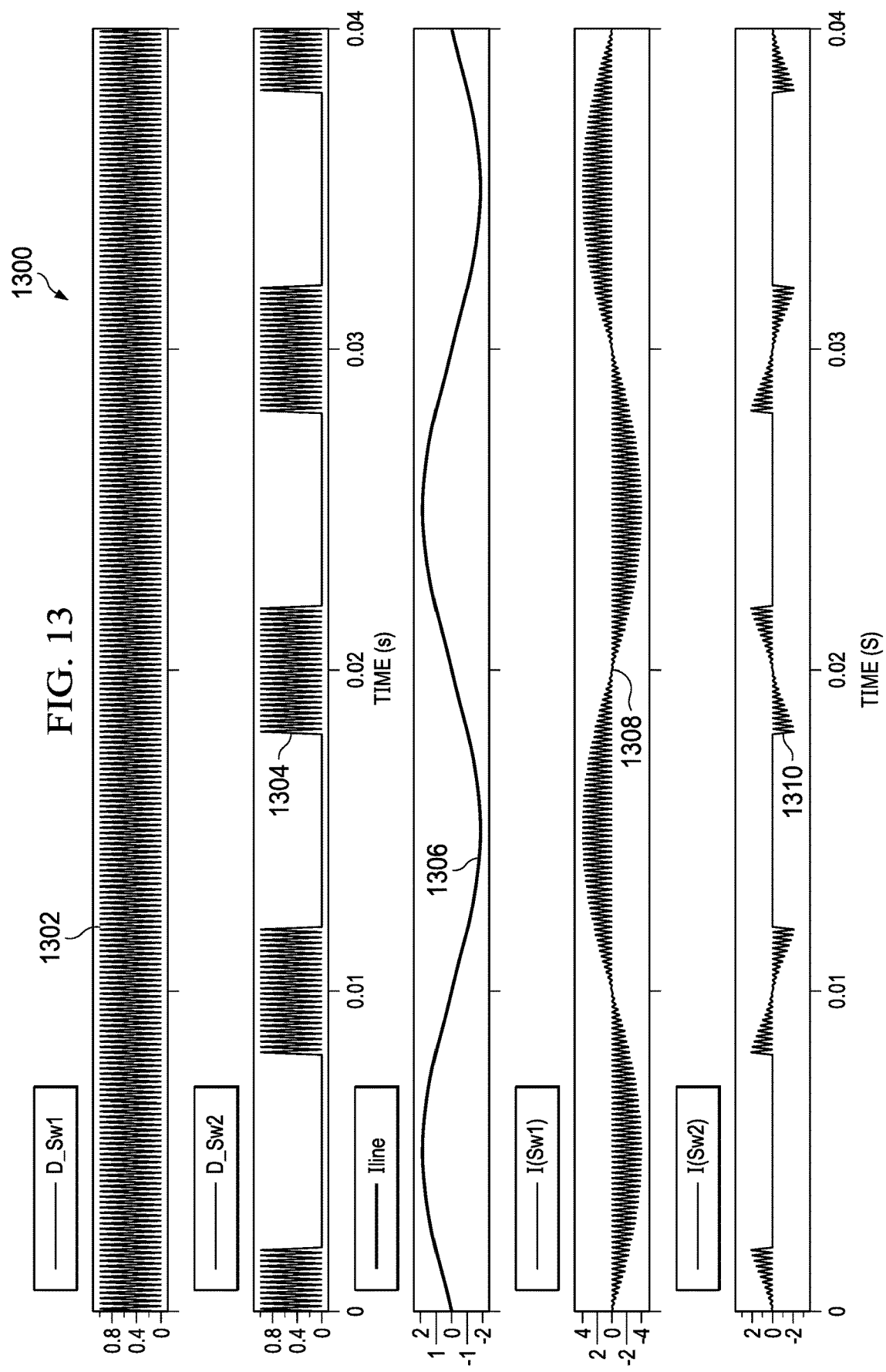
FIG. 13 is a fifth example timing diagram including sixth example waveforms of the first PFC circuit of FIGS. 1 and/or 7.

FIG. 13 is a fifth example timing diagram 1300 including sixth example waveforms 1302, 1304, 1306, 1308, 1310 of the first PFC circuit 102 of FIGS. 1 and/or 7. The sixth waveforms 1302, 1304, 1306, 1308, 1310 include a first example waveform 1302, a second example waveform 1304, a third example waveform 1306, a fourth example waveform 1308, and a fifth example waveform 1310. In this example, the sixth waveforms 1302, 1304, 1306, 1308, 1310 are generated responsive to a power source having a voltage (such as an input voltage, VIN, etc.) of 220V AC. For example, the sixth waveforms 1302, 1304, 1306, 1308, 1310 can be generated responsive to the first power conversion system 100 and/or the third power conversion system 700 operating in transition mode.

The first waveform 1302 is a waveform of a first control signal of the first switch 110 of FIGS. 1 and/or 7. For example, the first control signal can be a signal provided to the first gate terminal of the first switch 110 to turn on the first switch 110, turn off the first switch 110, etc. In such examples, the first switch 110 can be turned on responsive to the first waveform 1302 having a value of 1 (e.g., a digital '1') and can be turned off responsive to the first waveform 1302 having a value of 0 (e.g., a digital '0'). The second waveform 1304 is a waveform of a second control signal of the second switch 124 of FIGS. 1 and/or 7. For example, the second control signal can be a signal provided to the second gate terminal of the second switch 124 to turn on the second switch 124, turn off the second switch 124, etc. In such examples, the second switch 124 can be turned on responsive to the second waveform 1204 having a value of 1 (e.g., a digital '1') and can be turned off responsive to the second waveform 1304 having a value of 0 (e.g., a digital '0'). The third waveform 1306 is a waveform of current of the power source 104 of FIGS. 1 and/or 7. The fourth waveform 1308 is a waveform of current flowing through the first switch 110. The fifth waveform 1310 is a waveform of current flowing through the second switch 124.

Advantageously, the voltage multiplier circuit 114 of FIGS. 1 and/or 7 can provide a voltage doubling assist responsive to the control signal being enabled (e.g., having a value corresponding to a digital '1'), which causes current to flow through the second switch 124. Advantageously, the voltage multiplier circuit 114 can provide voltage doubling when the input voltage is 220V AC, 240V AC, etc., to eliminate the voltage runway caused by unequal leakage currents of output capacitors, such as the first capacitor 126 and the second capacitor 128 of FIGS. 1 and/or 7. Advantageously, the voltage multiplier circuit 114 can provide voltage doubling of the input voltage to the load 106 while the first power conversion system 100 and/or the third power conversion system 700 is in and/or otherwise operating in transition mode.

FIG. 14 is a schematic diagram of the fourth power conversion system 1400 including a second PFC circuit 1410, a power source 1404, and a load 1406. The power source 1404 can correspond to the power source 104 of FIGS. 1-7. The load 1406 can correspond to the load 106 of FIGS. 1-7.

The second PFC circuit 1410 includes the first switch 1402 (SW1), a PFC controller 1407, an inductor ($L_{BOOST}$) 1408, a rectifier network 1412, which includes a first diode (D1) 1416, a second diode (D2) 1418, a third diode (D3) 1420, and a fourth diode (D4) 1422, and a capacitor (C) 1424. The first switch 1402 can correspond to the first switch 110 of FIGS. 1-7. The PFC controller 1407 can correspond to the PFC controller 107 of FIGS. 1-7. The inductor 1408 can correspond to the inductor 108 of FIGS. 1-7. The rectifier network 1412 can correspond to the rectifier network 112 of FIGS. 1-7. The first diode 1416, the second diode 1418, the third diode 1420, and the fourth diode 1422 can correspond respectively to the first diode 116, the second diode 118, the third diode 120, and the fourth diode 122 of FIGS. 1-7.

In this example, the second PFC circuit 1410 is a bridgeless PFC boost converter. The second PFC circuit 1410 is a universal input PFC circuit that exhibits relatively low efficiency at a low end of an input voltage range (such as 100V AC, 110V AC, 200V AC, 220V AC, etc.). At the low end of the input voltage range, the RMS currents of the second PFC circuit 1410 increase significantly, which causes higher copper loss in all magnetic devices or elements of the second PFC circuit 1410, such as the inductor 1408.

Advantageously, the first PFC circuit 102 is an improvement over the second PFC circuit 1410 of FIG. 14 because the first PFC circuit 102 includes the voltage multiplier circuit 114 in conjunction with the bidirectional switch bridgeless topology to improve the efficiency of the corresponding power conversion system 100, 600, 700 and to eliminate the voltage imbalance on an output capacitor, such as the capacitor 1424 of FIG. 14. Advantageously, the first PFC circuit 102 is an improvement over the second PFC circuit 1410 of FIG. 14 because the first PFC circuit 102 enables more energy to be transferred directly from the power source 104 to the load 106.

Figure 15:
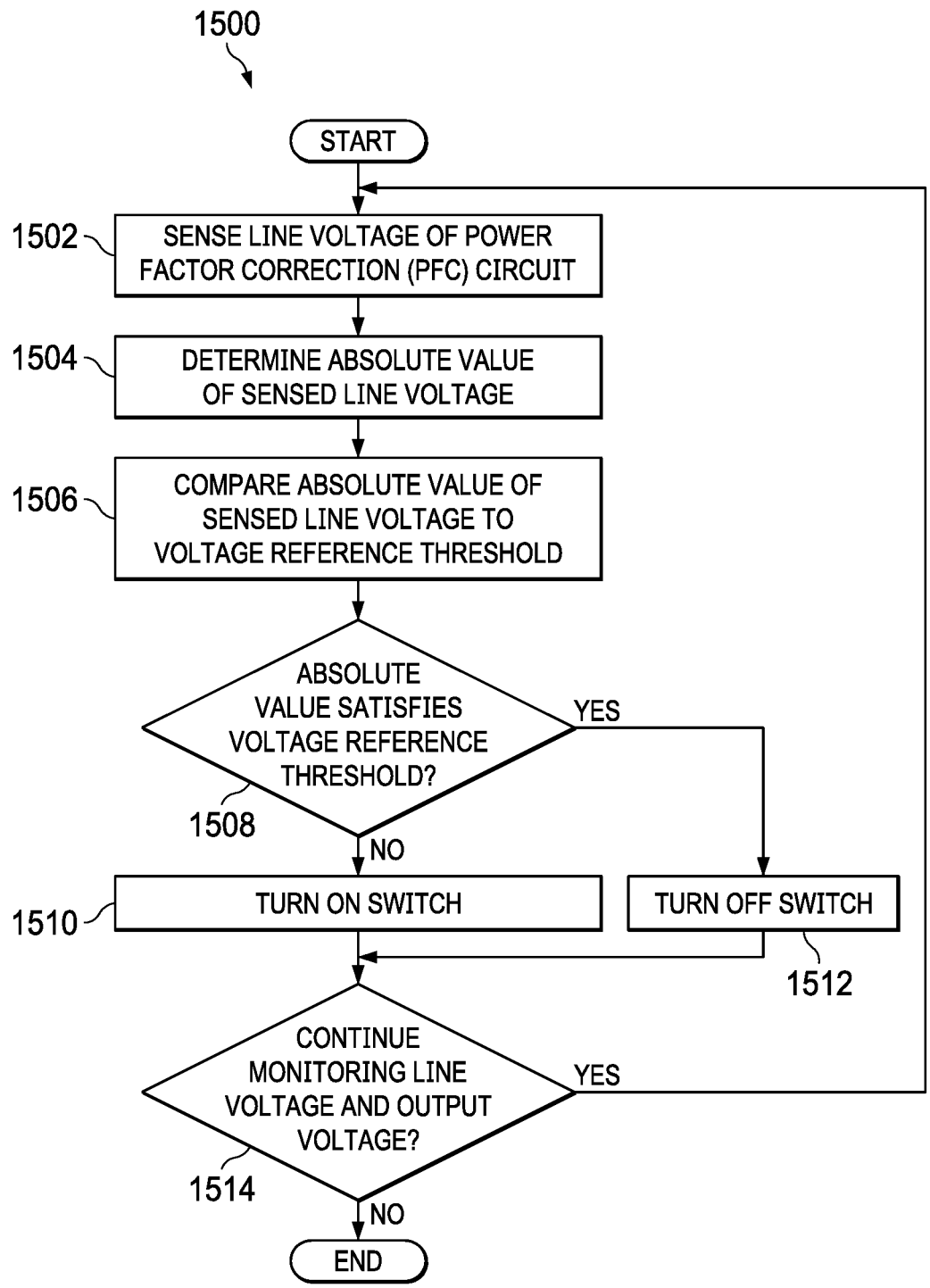
FIG. 15 is a flowchart representative of an example process that may be performed using machine readable instructions that can be executed and/or hardware configured to implement the first control logic circuitry of FIG. 6, and/or, more generally, the first PFC circuit of FIGS. 1 and/or 6, to control an example switch.
Figure 16:
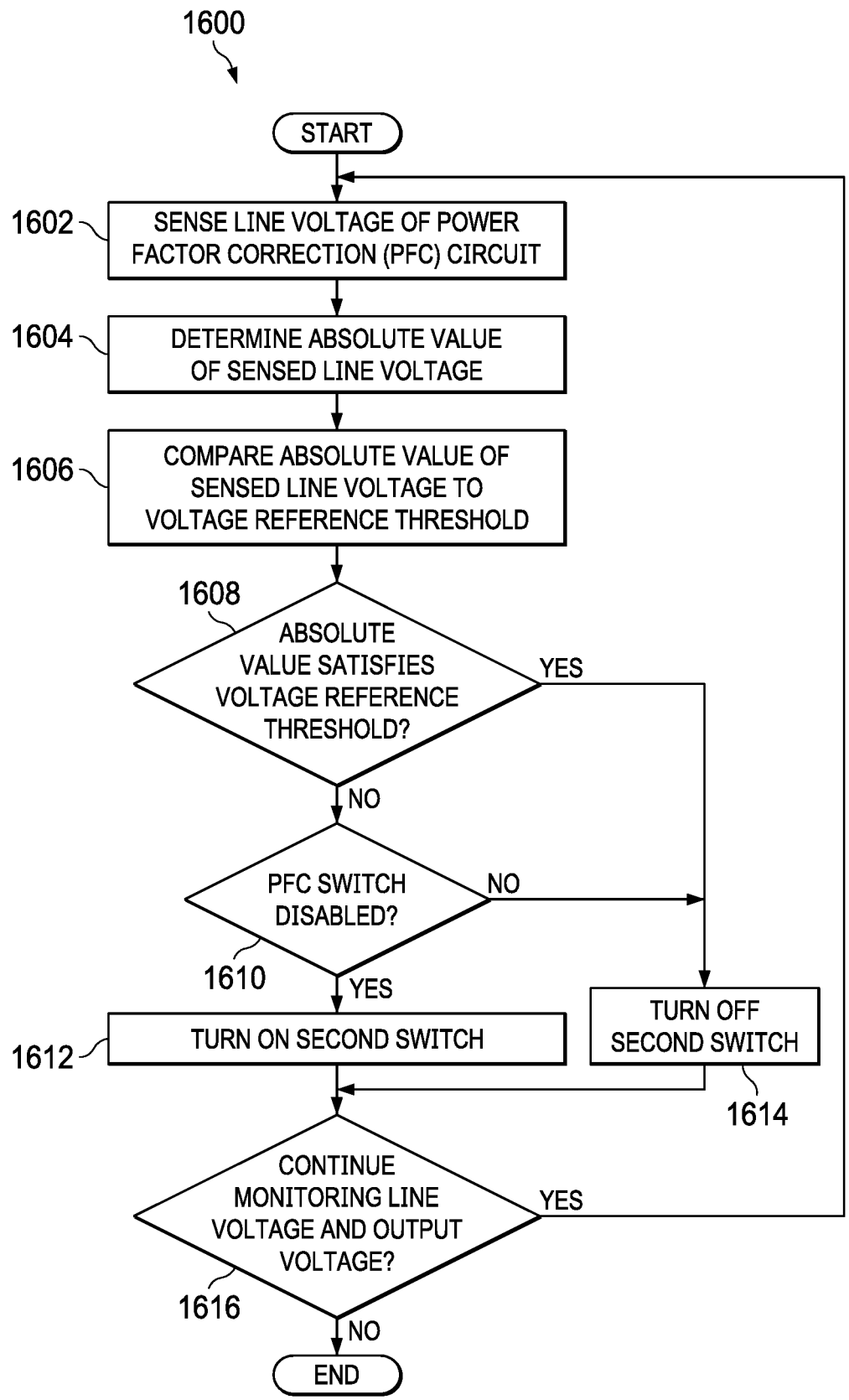
FIG. 16 is a flowchart representative of an example process that may be performed using machine readable instructions that can be executed and/or hardware configured to implement the second control logic circuitry of FIG. 7, and/or, more generally, the first PFC circuit of FIGS. 1 and/or 7, to control an example switch.

Flowcharts representative of an example process that may be performed using example hardware logic, example machine readable instructions (e.g., hardware readable instructions), example hardware implemented state machines, and/or any combination thereof configured to implement the first control logic circuitry 604 of FIG. 6 and/or the second control logic circuitry 704 of FIG. 7 are shown in FIGS. 15-16. The example machine readable instructions may be one or more executable programs or portion(s) of an executable program for execution by programmable processor(s), programmable controller(s), GPU (s), DSP(s), ASIC(s), PLD(s), and/or FPLD(s). The program may be embodied in software stored on a non-transitory computer readable storage medium (such as a non-volatile memory, volatile memory, etc.), but the entire program and/or parts thereof could alternatively be executed by any other device (e.g., programmable device) and/or embodied in firmware or dedicated hardware. Further, although the example program is described with reference to the flowcharts illustrated in FIGS. 15-16, many other methods of implementing the first control logic circuitry 604 and/or the second control logic circuitry 704 may alternatively be used. For example, the order of execution of the blocks may be changed, and/or some of the blocks described may be changed, eliminated, or combined. Additionally or alternatively, any or all of the blocks may be implemented by one or more hardware circuits (such as discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (such as portions of instructions, code, representations of code, etc.) useful to create, manufacture, and/or produce machine executable instructions. For example, the machine readable instructions may be fragmented and stored on one or more storage devices. The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

The machine readable instructions described herein can be represented by any past, present, or future instruction language, scripting language, programming language, etc. For example, the machine readable instructions may be represented using any of the following languages: assembly language, C, C++, Java, C#, Perl, Python, JavaScript, Hyper-Text Markup Language (HTML), Structured Query Language (SQL), Swift, etc.

As described above, the example processes of FIGS. 15-16 may be implemented using executable instructions (e.g., computer, machine, and/or hardware readable instructions) stored on a non-transitory computer and/or machine readable medium, such as a flash memory, a read-only memory, a cache, a random-access memory, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory machine readable medium, and/or non-transitory hardware readable medium is/are expressly defined to include any type of computer, machine, and/or hardware readable storage device and/or storage disk and to exclude propagating signals and to exclude transmission media.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

FIG. 15 is a flowchart representative of an example process 1500 that may be performed using machine readable instructions that can be executed and/or hardware configured to implement the first control logic circuitry 604 of FIG. 6 to achieve voltage multiplication (such as doubling, tripling, etc.) of an input voltage. The process 1500 begins at block 1502, at which the first control logic circuitry 604 senses a line voltage of a power factor correction (PFC) circuit. For example, the absolute value circuit 614 can determine, measure, and/or otherwise sense VIN of the power source 104 of the first PFC circuit 102 of FIG. 6.

At block 1504, the first control logic circuitry 604 determines an absolute value of the sensed line voltage. For example, the absolute value circuit 614 can determine an absolute value of VIN.

At block 1506, the first control logic circuitry 604 compares the absolute value of the sensed line voltage to a voltage reference threshold. For example, the comparator 616 can compare the absolute value of VIN received from the absolute value circuit 614 to $V_{REF}$. In such examples, $V_{REF}$ is a voltage at the voltage reference terminal 620.

At block 1508, the first control logic circuitry 604 determines whether the absolute value satisfies the voltage reference threshold. For example, the comparator 616 can assert a logic high signal responsive to the absolute value of VIN being less than $V_{REF}$ and, thus, the absolute value of VIN does not satisfy the voltage reference threshold of $V_{REF}$. In other examples, the comparator 616 can output a logic low signal responsive to the absolute value of VIN being greater than $V_{REF}$ and, thus, the absolute value of VIN satisfies the voltage reference threshold of $V_{REF}$.

If, at block 1508, the first control logic circuitry 604 determines that the absolute value satisfies the voltage reference threshold, control proceeds to block 1512 to turn off a switch. For example, the comparator 616 can output the logic low signal to turn off the second switch 124. In response to turning off the switch at block 1512, the first control logic circuitry 604 determines whether to continue monitoring the PFC circuit at block 1514. For example, the absolute value circuit 614 can determine to sense another line voltage of the first PFC circuit 102.

If, at block 1508, the first control logic circuitry 604 determines that the absolute value does not satisfy the voltage reference threshold, then, at block 1510, the first control logic circuitry 604 turns on a switch. For example, the comparator 616 can output the logic high signal to turn on the second switch 124. In response to turning on the switch at block 1510, control proceeds to block 1514 to determine whether to continue monitoring the line voltage and the output voltage. For example, the absolute value circuit 614 can determine to sense another line voltage of the first PFC circuit 102.

If, at block 1514, the first control logic circuitry 604 determines to continue monitoring the line voltage and output voltage, control returns to block 1502 to sense another line voltage of the PFC circuit, otherwise the process 1500 of FIG. 15 concludes.

FIG. 16 is a flowchart representative of an example process 1600 that may be performed using machine readable instructions that can be executed and/or hardware configured to implement the second control logic circuitry 704 of FIG. 7 to achieve voltage multiplication (such as doubling, tripling, etc.) of an input voltage. The process 1600 begins at block 1602, at which the second control logic circuitry 704 senses a line voltage of a power factor correction (PFC) circuit. For example, the absolute value circuit 614 can determine, measure, and/or otherwise sense VIN of the power source 104 of the first PFC circuit 102 of FIG. 7.

At block 1604, the second control logic circuitry 704 determines an absolute value of the sensed line voltage. For example, the absolute value circuit 614 can determine an absolute value of VIN.

At block 1606, the second control logic circuitry 704 compares the absolute value of the sensed line voltage to a voltage reference threshold. For example, the comparator 616 can compare the absolute value of VIN received from the absolute value circuit 614 to $V_{REF}$. In such examples, $V_{REF}$ is a voltage at the voltage reference terminal 620.

At block 1608, the second control logic circuitry 704 determines whether the absolute value satisfies the voltage reference threshold. For example, the comparator 616 can assert a logic high signal responsive to the absolute value of VIN being less than $V_{REF}$ and, thus, the absolute value of VIN does not satisfy the voltage reference threshold of $V_{REF}$. In other examples, the comparator 616 can output a logic low signal responsive to the absolute value of VIN being greater than $V_{REF}$ and, thus, the absolute value of VIN satisfies the voltage reference threshold of $V_{REF}$.

If, at block 1608, the second control logic circuitry 704 determines that the absolute value satisfies the voltage reference threshold, control proceeds to block 1614 to turn off a second switch. For example, the comparator 616 can output the logic low signal to cause the second logic gate 708 to output a logic low signal to turn off the second switch 124. In response to turning off the switch at block 1614, the second control logic circuitry 704 determines whether to continue monitoring the line voltage and output voltage at block 1616. For example, the absolute value circuit 614 can determine to sense another line voltage of the first PFC circuit 102.

If, at block 1608, the second control logic circuitry 704 determines that the absolute value does not satisfy the voltage reference threshold, then, at block 1610, the second control logic circuitry 704 determines whether a PFC switch is disabled. For example, the PFC controller 107 can output a logic low signal responsive to turning off the first switch 110. In such examples, the logic low signal from the PFC controller 107 is representative of the first switch 110 being turned off. The logic low signal from the PFC controller 107 can be inverted by the first logic gate 706 to a logic high signal.

At block 1612, the second control logic circuitry 704 turns on a second switch. For example, the second logic gate 708 can assert a logic high signal to turn on the second switch 124. In response to turning on the second switch at block 1612, control proceeds to block 1616 to determine whether to continue monitoring the line voltage and output voltage. For example, the absolute value circuit 614 can determine to sense another line voltage of the first PFC circuit 102.

If, at block 1616, the second control logic circuitry 704 determines to continue monitoring the line voltage and output voltage, control returns to block 1602 to sense another line voltage of the PFC circuit, otherwise the process 1600 of FIG. 16 concludes.

Example methods, apparatus, and articles of manufacture described herein improve efficiencies of PFC circuits at lower ends of an input voltage range of the PFC circuits and improve the total harmonic distribution at lighter loads without affecting the efficiencies elsewhere in the PFC circuits. Example methods, apparatus, and articles of manufacture described herein increase an off time of a switch, such as a PFC switch, and, thus, decreases a switching frequency of the PFC circuit. Example methods, apparatus, and articles of manufacture described herein decrease inductor core loss, inductor winding AC resistance, and inductor loss responsive to decreasing the switching frequency.

Modifications are possible in the described embodiments, and other embodiments are possible, within the scope of the claims.

What is claimed is:

1. An apparatus comprising:
    a power conversion circuit having a power control input, a power output, and first and second alternating current (AC) power inputs;
    a power conversion control circuit having a power control output coupled to the power control input;
    a voltage multiplier control circuit having a control output and first, second, and third multiplier control inputs, the first multiplier control input coupled to the first AC power input, the second multiplier control input coupled to the second AC power input, the third multiplier control input coupled to the power output, and the voltage multiplier control circuit including:
        an absolute value circuit having a circuit output and first and second circuit inputs, the first circuit input coupled to the first multiplier control input, and the second circuit input coupled to the second multiplier control input;
        a comparator having a comparator output and first and second comparator inputs, the first comparator input coupled to the circuit output, the second comparator input coupled to the third multiplier control input, and the comparator output coupled to the control output.

2. The apparatus of claim 1, wherein the power conversion control circuit includes a power factor correction (PFC) control circuit.

3. The apparatus of claim 1, wherein the absolute value circuit includes at least one of: a rectifier circuit, or an operational amplifier circuit.

4. The apparatus of claim 1, wherein the absolute value circuit is configured to provide a first voltage at the circuit output representing an absolute value of a voltage difference between the first and second AC power inputs; and
    wherein the voltage multiplier control circuit is configured to set a state of the control output responsive to a comparison between the first voltage and a second voltage at the second multiplier control input.

5. The apparatus of claim 4, wherein:
    the control output is coupled to a control terminal of a voltage multiplier circuit;
    the voltage multiplier control circuit is configured to:
        set the control output to a first state responsive to the first voltage being below the second voltage; and
        set the control output to a second state responsive to the first voltage exceeding the second voltage; and
    the voltage multiplier circuit is enabled responsive to the control output being in the first state, and the voltage multiplier circuit is disabled responsive to the control output being in the second state.

6. The apparatus of claim 5, wherein the second voltage equals half of a third voltage at the power output.

7. The apparatus of claim 5, wherein the voltage multiplier control circuit has a control input coupled to the power control output, and the voltage multiplier control circuit is configured to set a state of the control output responsive to a state of the control input.

8. The apparatus of claim 7, wherein the power conversion circuit includes a switch coupled between the first and second AC power inputs; and
wherein a state of the control input indicates whether the switch is in an enabled state or in a disabled state.

9. The apparatus of claim 8, wherein the voltage multiplier control circuit is configured to:
set the control output to the first state responsive to the first voltage being below the second voltage, and the state of the control input indicating that the switch is in the disabled state; and
set the control output to the second state responsive to at least one of: the first voltage exceeding the second voltage, or the state of the control input indicating that the switch is in the enabled state.

10. The apparatus of claim 9, wherein:
the voltage multiplier control circuit includes a logic circuit having a logic output and first and second logic inputs, the first logic input coupled to the control input, the second logic input coupled to the comparator output, and the logic output coupled to the control output.

11. An apparatus comprising:
a power conversion circuit having a power input and first and second power outputs;
a first capacitor having first and second capacitor terminals, the first capacitor terminal coupled to the first power output;
a second capacitor having third and fourth capacitor terminals, the third capacitor terminal coupled to the second capacitor terminal, and the fourth capacitor terminal coupled to the second power output;
a first switch having a switch control input and first and second current terminals, the first current terminal coupled to the power input, the second current terminal coupled to the second and third capacitor terminals;
a first control circuit having a first control output and first and second control inputs, the first control input coupled to the first or second power outputs, the second control input coupled to the power input, and the first control output coupled to the switch control input;
a second switch having a second switch control input, the second switch coupled between the first and second AC power inputs; and
a second control circuit having a second control output coupled to the second switch control input, the second control circuit configured to set the second control output to a first state or a second state, wherein the second control circuit is coupled to a third control input of the first control circuit.

12. The apparatus of claim 11, wherein the first switch and the first and second capacitors are part of the power conversion circuit.

13. The apparatus of claim 11, wherein the power input includes a first AC power input and a second AC power input, and the first control circuit includes:
a circuit having a circuit output and first and second circuit inputs, the first circuit input coupled to the first AC power input, the second circuit input coupled to the second AC power input, and the circuit configured to provide a voltage at the circuit output representing an absolute value of a voltage difference between the first and second AC power inputs; and
a comparator having a comparator output and first and second comparator inputs, the first comparator input coupled to the circuit output, and the comparator output coupled to the first control output.

14. The apparatus of claim 13, wherein the power conversion circuit includes a rectifier having first and second rectifier inputs and first and second rectifier outputs, the first rectifier input coupled to the first AC power input, the second rectifier input coupled to the second AC power input and the first current terminal, the first rectifier output coupled to the first power output, and the second rectifier output coupled to the second power output.

15. The apparatus of claim 13, wherein the voltage is a first voltage, and the first control circuit is configured to set a state of the first control output responsive to a comparison between the first voltage at the first comparator input and a second voltage at the second comparator input, the second voltage representing a third voltage between the first and second power outputs.

16. The apparatus of claim 15, wherein:
the first control circuit is configured to:
set the first control output to a first state responsive to the first voltage being below the second voltage; and
set the first control output to a second state responsive to the first voltage exceeding the second voltage; and
the first switch is enabled responsive to the first control output being in the first state, and the first switch is disabled responsive to the first control output being in the second state.

17. The apparatus of claim 15, further comprising a voltage divider configured to generate the second voltage from the third voltage.

18. The apparatus of claim 15, wherein:
the second switch is enabled responsive to the second control output being in the first state, and the second switch is disabled responsive to the second control output being in the second state.

19. The apparatus of claim 18, wherein the first control circuit is configured to:
set the first control output to the first state responsive to the first voltage being below the second voltage, and the third control input being in the second state; and
set the first control output to the second state responsive to at least one of: the first voltage exceeding the second voltage, or the third control input being in the first state.

20. The apparatus of claim 19, wherein the second control circuit is a power factor correction (PFC) control circuit.

21. A system comprising:
a power conversion circuit having a power input and a power output, wherein the power input includes a first AC power input and a second AC power input;
a voltage multiplier circuit having a multiplier control input and a multiplier output, the multiplier output coupled to the power output;
a first control circuit having first and second control inputs and a first control output, the first control input coupled to the power input, the second control input coupled to the power output, and the first control output coupled to the multiplier control input; and
a second control circuit having a second control output coupled to a third control input of the first control circuit, wherein:

the power conversion circuit includes a switch having a switch control input, the switch coupled between the first and second AC power inputs;

the second control output of the second control circuit is coupled to the switch control input, the second control circuit configured to set the second control output to a first state or a second state; and the switch is enabled responsive to the second control output being in the first state, and the switch is disabled responsive to the second control output being in the second state.

22. The system of claim 21, wherein the power output is a first power output, the multiplier output is a first multiplier output coupled to the first power output, the power conversion circuit has a second power output, the voltage multiplier circuit has a second multiplier output coupled to the second power output, and the voltage multiplier circuit includes:

a first capacitor having first and second capacitor terminals, the first capacitor terminal coupled to the first multiplier output;

a second capacitor having third and fourth capacitor terminals, the third capacitor terminal coupled to the second capacitor terminal, and the fourth capacitor terminal coupled to the second multiplier output; and a switch having a switch control input and first and second current terminals, the first current terminal coupled to the power input, the second current terminal coupled to the second and third capacitor terminals, and the switch control input coupled to the multiplier control input.

23. The system of claim 21, wherein the power input includes a first AC power input and a second AC power input, and the first control circuit includes:

a circuit having a circuit output and first and second circuit inputs, the first circuit input coupled to the first AC power input, the second circuit input coupled to the second AC power input, and the circuit configured to provide a voltage at the circuit output representing an absolute value of a voltage difference between the first and second AC power inputs; and a comparator having a comparator output and first and second comparator inputs, the first comparator input coupled to the circuit output, and the comparator output coupled to the first control output.

24. The system of claim 21, wherein the second control circuit is a power factor correction (PFC) control circuit.

* * * * *